(12) United States Patent
Endo et al.

(10) Patent No.: US 12,050,147 B2
(45) Date of Patent: Jul. 30, 2024

(54) ANALYSIS DEVICE AND ANALYSIS METHOD

(71) Applicant: Nippon Telegraph and Telephone Corporation, Tokyo (JP)

(72) Inventors: Jun Endo, Tokyo (JP); Atsushi Aratake, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 621 days.

(21) Appl. No.: 17/421,488

(22) PCT Filed: Feb. 7, 2020

(86) PCT No.: PCT/JP2020/004858
§ 371 (c)(1),
(2) Date: Jul. 8, 2021

(87) PCT Pub. No.: WO2020/170862
PCT Pub. Date: Aug. 27, 2020

(65) Prior Publication Data
US 2022/0065741 A1    Mar. 3, 2022

(30) Foreign Application Priority Data

Feb. 22, 2019 (JP) ................. 2019-030267

(51) Int. Cl.
*G01M 11/02* (2006.01)
*G01N 27/83* (2006.01)
(Continued)

(52) U.S. Cl.
CPC ........... *G01M 11/025* (2013.01); *G01N 27/83* (2013.01); *G02B 6/122* (2013.01); *G02B 6/4292* (2013.01); *G06F 17/13* (2013.01)

(58) Field of Classification Search
CPC ..... G01M 11/025; G01N 27/83; G02B 6/122; G02B 6/4292; G06F 17/13
See application file for complete search history.

(56) References Cited

FOREIGN PATENT DOCUMENTS

JP    2001264556 A    9/2001

OTHER PUBLICATIONS

Montalbo TM. Fiber to waveguide couplers for silicon photonics (Doctoral dissertation, Massachusetts Institute of Technology). (Year: 2004).*

(Continued)

*Primary Examiner* — Chuen-Meei Gan
(74) *Attorney, Agent, or Firm* — Slater Matsil, LLP

(57) ABSTRACT

An analysis apparatus includes a setting device configured to set information on a structure of an optical connection structure, a solution device configured to solve a partial differential equation having, as an unknown, an electromagnetic field distributed in the optical connection structure based on the information on the structure of the optical connection structure to determine a distribution of the electromagnetic field, a data extraction device configured to extract, from the distribution of the electromagnetic field determined by the solution device, a mode distribution in a plane at a predetermined position of the optical connection structure and a time response of an electromagnetic field at a predetermined position of the optical connection structure, and a characteristics analysis device configured to analyze optical characteristics of the optical connection structure based on the mode distribution and the time response of the electromagnetic field extracted by the data extraction device.

8 Claims, 17 Drawing Sheets

(51) Int. Cl.
  *G02B 6/122* (2006.01)
  *G02B 6/42* (2006.01)
  *G06F 17/13* (2006.01)

(56) References Cited

OTHER PUBLICATIONS

Bhatia N, John J. Multimode interference devices with single-mode-multimode-multimode fiber structure. Applied Optics. Aug. 10, 2014;53(23):5179-86. (Year: 2014).*

Tang J, Zhou J, Guan J, Long S, Yu J, Guan H, Lu H, Luo Y, Zhang J, Chen Z. Fabrication of side-polished single mode-multimode-single mode fiber and its characteristics of refractive index sensing. IEEE Journal of Selected Topics in Quantum Electronics. Oct. 10, 2016;23(2):238-45. (Year: 2016).*

Shiraishi K, Tsai CS. A micro light-beam spot-size converter using a hemicylindrical GRIN-slab tip with high-index contrast. Journal of lightwave technology. Nov. 2005;23(11):3821-6. (Year: 2005).*

\* cited by examiner

ANALYSIS DEVICE AND ANALYSIS METHOD

CROSS-REFERENCE TO RELATED APPLICATIONS

This application is a national phase entry of PCT Application No. PCT/JP2020/004858, filed on Feb. 7, 2020, which claims priority to Japanese Application No. 2019-030267, filed on Feb. 22, 2019, which applications are hereby incorporated herein by reference.

TECHNICAL FIELD

The present invention relates to an analysis apparatus and an analysis method, and particularly relates to a technique for analyzing an optical connection structure.

BACKGROUND

In recent years, miniaturization and high density have been required for optical communication equipment as communication capacities increases. Techniques for analyzing an optical connection structure between waveguides that are components of optical communication equipment have become increasingly important. A ray tracing method is often used in the related art to analyze coupling characteristics of an optical connection structure having a relatively large-sized area. In addition, a method of analyzing coupling characteristics based on wave optics such as a beam propagation method is adopted for single waveguides.

For example, Patent Literature 1 discloses a waveguide analysis apparatus that simulates light transmission characteristics by approximating an optical electric field propagating in a waveguide using a beam propagation method. In addition, FIG. 25 illustrates a flowchart of an optical electric field calculation method applied to a waveguide analysis apparatus of the related art. In the optical electric field calculation method of the related art, first, structural data such as a distribution of a refractive index, electromagnetic field components, and the like of a cross-section of a waveguide is input (step S500). Next, an optical electric field is calculated using the beam propagation method (step S501). Then, a coupling efficiency of the waveguide is calculated based on the calculated optical electric field (step S502).

CITATION LIST

Patent Literature

PTL 1: JP 2001-264556 A

SUMMARY

Technical Problem

For example, when two or more waveguides such as an Si waveguide and an optical fiber having a large difference in refractive index are coupled, a variety of optical connection structures such as tapered-type, grading-type, and microlenses are sandwiched between the waveguides. A microregion at a connection of such optical connection structures has a distribution of an electromagnetic field in which many modes are combined. Thus, analysis techniques using approximation of beam propagation have a problem in that analysis of the optical connection structure, such as prediction of transmission characteristics of the optical connection structure is difficult.

Embodiments of the present invention are conceived in order to solve the problem described above, and aims to provide an analysis technique that enables an optical connection structure to be analyzed even when the optical connection structure has a distribution of an electromagnetic field in which many modes are combined.

Means for Solving the Problem

In order to solve the problem described above, an analysis apparatus according to embodiments of the present invention includes a setting unit configured to set information on a structure of an optical connection structure, a solution unit configured to solve a partial differential equation having, as an unknown, an electromagnetic field distributed in the optical connection structure based on the information on the structure of the optical connection structure to determine a distribution of the electromagnetic field, a data extraction unit configured to extract, from the distribution of the electromagnetic field determined by the solution unit, a mode distribution in a plane at a predetermined position of the optical connection structure and a time response of an electromagnetic field at a predetermined position of the optical connection structure, and a characteristics analysis unit configured to analyze optical characteristics of the optical connection structure based on the mode distribution and the time response of the electromagnetic field extracted by the data extraction unit.

Further, in the analysis apparatus according to embodiments of the present invention, the optical connection structure includes a first waveguide, a second waveguide, and an optical element optically connecting the first waveguide and the second waveguide to each other, and the solution unit may include a waveguide mode calculation unit configured to calculate a waveguide mode indicating an electromagnetic field in which zeroth or higher order eigenmodes are combined when reflection does not occur on an end surface of the first waveguide facing the optical element, a first distribution calculation unit configured to calculate a distribution of an electromagnetic field of a region included in the optical connection structure based on the waveguide mode, and a second distribution calculation unit configured to calculate a distribution of a reference electric field indicating a distribution of an electromagnetic field of a region included in the first waveguide and the optical element when electromagnetic waves propagate from the first waveguide toward the second waveguide.

Further, in the analysis apparatus according to embodiments of the present invention, the solution unit may include an eigenmode calculation unit configured to calculate an eigenmode of the second waveguide, the data extraction unit may include a mode distribution extraction unit configured to extract a mode distribution within a cross section intersecting an optical axis of the second waveguide, and the characteristics analysis unit may include a coupling efficiency calculation unit configured to calculate a coupling efficiency of the eigenmode and the mode distribution based on the eigenmode calculated by the eigenmode calculation unit and the mode distribution extracted by the mode distribution extraction unit.

Further, in the analysis apparatus according to embodiments of the present invention, the data extraction unit may include a first response calculation unit configured to obtain a temporal change of an electric field at first reference coordinates set at a position intersecting an optical axis of the optical element by the distribution of the electromagnetic field calculated by the first distribution calculation unit, a second response calculation unit configured to obtain a temporal change of an electric field at second reference coordinates set at a position intersecting the optical axis of the second waveguide by the distribution of the electromagnetic field calculated by the first distribution calculation unit, and a third response calculation unit configured to obtain a temporal change of the reference electric field at the first reference coordinates from the distribution of the reference electric field calculated by the second distribution calculation unit.

Further, in the analysis apparatus according to embodiments of the present invention, the characteristics analysis unit may include a reflectance calculation unit configured to calculate a reflectance at the first reference coordinates based on the temporal change of the electric field at the first reference coordinates obtained by the first response calculation unit and the temporal change of the reference electric field obtained by the third response calculation unit.

Further, in the analysis apparatus according to embodiments of the present invention, the characteristics analysis unit may include a transmittance calculation unit configured to calculate a transmittance at the second reference coordinates based on the temporal change of the electric field at the second reference coordinates obtained by the second response calculation unit and the temporal change of the reference electric field obtained by the third response calculation unit.

Further, the analysis apparatus according to embodiments of the present invention may further include an evaluation unit configured to evaluate the structure of the optical connection structure set by the setting unit based on preset optical characteristics from optical characteristics of the optical connection structure analyzed by the characteristics analysis unit.

In order to solve the problems described above, an analysis method according to embodiments of the present invention includes setting information on a structure of an optical connection structure, solving a partial differential equation having, as an unknown, an electromagnetic field distributed in the optical connection structure based on the information on the structure of the optical connection structure to determine a distribution of the electromagnetic field, obtaining, from the distribution of the electromagnetic field determined, a mode distribution in a plane at a predetermined position of the optical connection structure and a time response of an electromagnetic field at a predetermined position of the optical connection structure, and analyzing optical characteristics of the optical connection structure based on the mode distribution and the time response of the electromagnetic field obtained.

Effects of Embodiments of the Invention

According to embodiments of the present invention, the partial differential equation having, as an unknown, the electromagnetic field distributed in the optical connection structure is solved, the mode distribution within the plane at the predetermined position of the optical connection structure and the time response of the electromagnetic field are extracted from the determined distribution of the electromagnetic wave, and thus even when many modes of electromagnetic fields are combined, the optical connection structure can be analyzed.

DETAILED DESCRIPTION OF ILLUSTRATIVE EMBODIMENTS

Figure 1:
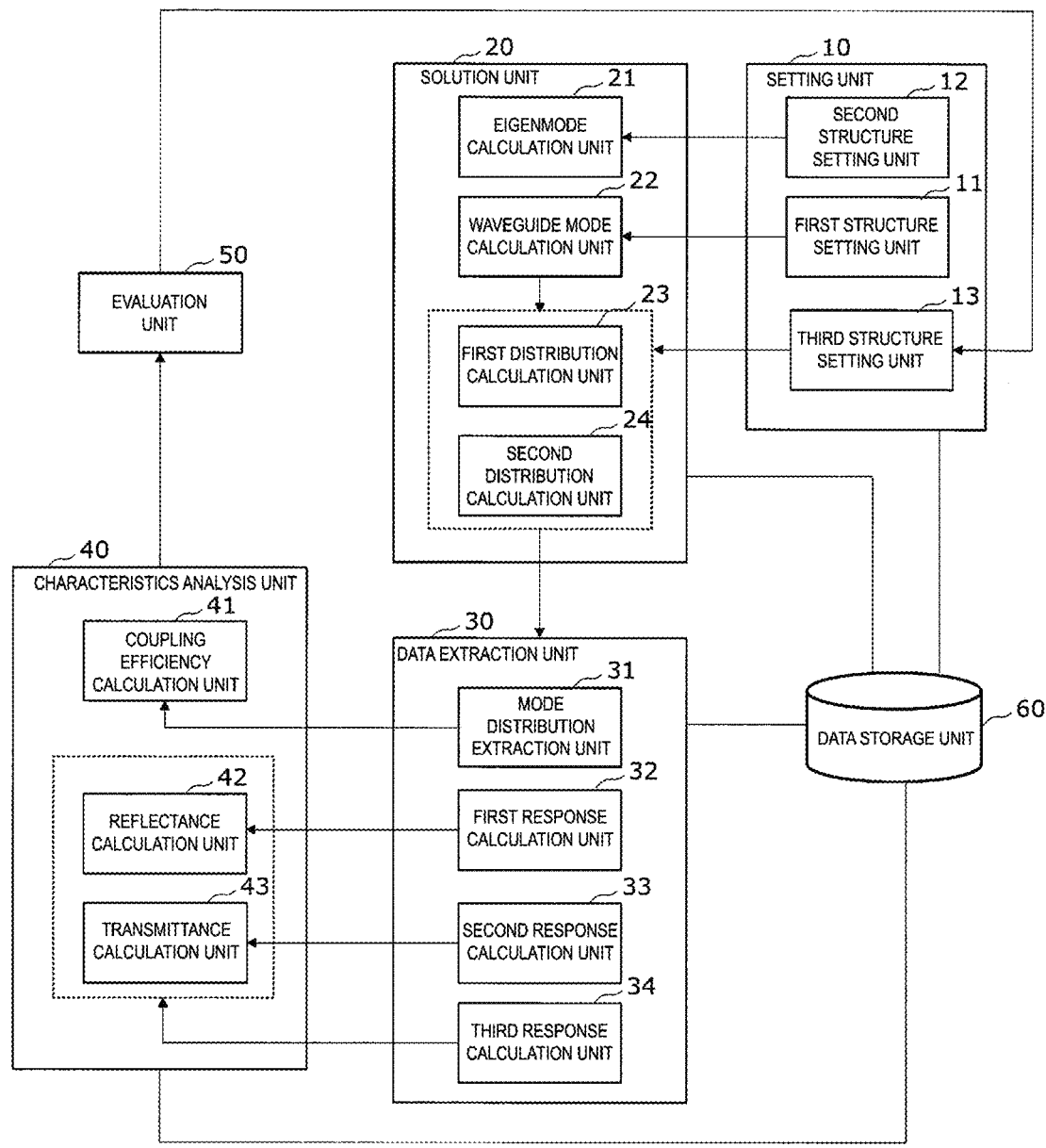
FIG. 1 is a block diagram illustrating a structure of an analysis apparatus according to an embodiment of the present invention.

Hereinafter, embodiments of the present invention will be described in detail with reference to FIGS. 1 to 24.

The analysis apparatus 1 according to the present embodiment analyzes characteristics of an optical connection structure including a small optical element. In particular, the analysis apparatus 1 according to the present embodiment analyzes a distribution of an electromagnetic field in an optical connection region in which waveguides with different mode fields are coupled, and determines a shape and a physical property value of an optical element connecting two waveguides included in the optical connection structure.

First, an optical connection structure 110 to be analyzed by the analysis apparatus 1 will be described with reference to FIG. 2. As illustrated in the schematic plan view of FIG. 2, the optical connection structure 110 includes a first waveguide 120, a second waveguide, and an optical element 140 connecting the first waveguide 120 and the second waveguide 130.

The optical connection structure 110 converts a mode field of light (electromagnetic waves) input to the first waveguide 120 to be coupled to the second waveguide 130. It is assumed in description below that x, y, and z axes illustrated in the drawing including FIG. 2 are orthogonal to each other, and the vertical direction is set as the y axis, the horizontal direction is set as the x axis, and the propagation direction of light, that is, the direction along the optical axis, is set as the z axis. In addition, in the present embodiment, a case in which light is input from the first waveguide 120 and propagates to the second waveguide 130 will be described.

The first waveguide 120 includes a core 121 and a cladding 122 covering the core 121. One end of the core 121 faces the core 131 of the second waveguide 130 via the optical element 140. The core 121 maintains a constant cross-sectional shape in the x axis direction along a propagation direction (z axis) of light, for example. For example, an edge of the core 121 is formed in a rectangular parallelepiped shape. Note that the cross-sectional area of the core 121 in a direction perpendicular to the light propagation direction (z axis) is smaller than the cross-sectional area of the core 131 of the second waveguide 130 in a direction perpendicular to the light propagation direction (z axis), which will be described below.

The cladding 122 is formed to cover the core 121. The cladding 122 is formed of, for example, a silicon oxide material. In addition, the core 121 is formed of, for example, an Si material.

The second waveguide 130 includes the core 131 and a cladding 132 covering the core 131. The second waveguide 130 constitutes, for example, an optical fiber. The core 131 is provided at the center of the second waveguide 130 and propagates light of which the mode field has been converted by the first waveguide 120. The core 131 has a circular cross-section, for example. The cladding 132 is formed to cover the outer circumferential surface of the core 131.

The optical element 140 optically connects the first waveguide 120 and the second waveguide 130. The optical element 140 is arranged in the gap between an end surface of the first waveguide 120 and an end surface of the second waveguide 130 facing the aforementioned end surface. In the present embodiment, the optical connection structure 110 is analyzed by the analysis apparatus 1 to determine whether the shape or physical property value of the optical element 140 needs to be modified.

Function Blocks of Analysis Apparatus

Next, a functional configuration of the analysis apparatus 1 for the optical connection structure 110 according to the present embodiment will be described with reference to FIG. 1.

As illustrated in FIG. 1, the analysis apparatus 1 includes a setting unit 10, a solution unit 20, a data extraction unit 30, a characteristics analysis unit 40, an evaluation unit 50, and a data storage unit 60.

The setting unit 10 includes a first structure setting unit 11, a second structure setting unit 12, and a third structure setting unit 13. The setting unit 10 sets information on the structure of the optical connection structure 110, such as the shapes, a distribution of physical property values of the first waveguide 120, the second waveguide 130, and the optical element 140, and the like, in accordance with, for example, an input signal input from the outside to an input device 107. In addition, the setting unit 10 sets a mesh spacings which is a divided area of the optical connection structure 110 used by the solution unit 20 to calculate characteristics of the optical connection structure 110.

The first structure setting unit 11 sets dimensions of the shape and a distribution of physical property values of the first waveguide 120. The second structure setting unit 12 sets dimensions of the shape and a distribution of physical property values of the second waveguide 130. The third structure setting unit 13 sets dimensions of the shape and a distribution of physical property values of the optical element 140. Parameters indicating the set shapes and physical property values of the optical connection structure 110 are stored in the data storage unit 60.

The solution unit 20 includes an eigenmode calculation unit 21, a waveguide mode calculation unit 22, a first distribution calculation unit 23, and a second distribution calculation unit 24. The solution unit 20 solves a partial differential equation with an electromagnetic field distributed in the optical connection structure 110 as an unknown to determine the distribution of the electromagnetic field. Specifically, the solution unit 20 determines a waveguide mode of the first waveguide 120, an eigenmode of the second waveguide 130, and a distribution of an electromagnetic field propagating from the first waveguide 120 toward the second waveguide 130 by solving the following governing equation. In addition, the solution unit 20 determines a distribution of an electric field (referred to as a "distribution of a reference electric field") from the distribution of the electromagnetic field on the assumption that there is no electromagnetic field propagating toward the first waveguide 120 in order to separate traveling waves from reflected waves.

The eigenmode calculation unit 21 calculates an eigenmode of the second waveguide 130 based on the shape and distribution of physical property values of the second waveguide 130 set by the second structure setting unit 12. More specifically, the eigenmode calculation unit 21 uses a finite element method to calculate the eigenmode. The eigenmode is a function representing a state of the system, and in the system, an energy distribution of the electromagnetic field localized in the core 131 of the second waveguide 130 is determined.

The eigenmode calculation unit 21 uses a Helmholtz equation as a governing equation for determining the energy distribution of the electromagnetic field localized in the core 131 to obtain a function representing the state of the system under a fixed boundary condition, that is, the eigenmode. The Helmholtz equation having, as an unknown, the state function φ defined depending on a propagation constant β, a refractive index n, a wavenumber $k_a$ ($k_a=2\pi/\lambda$), and a non-homogeneous term f is represented by the following equation (1).

Math. 1

$$\frac{\partial^2 \phi}{\partial x^2} + \frac{\partial^2 \phi}{\partial y^2} + (k_a^2 n^2 - \beta^2)\phi = f \quad (1)$$

The eigenmode calculation unit 21 solves the Helmholtz equation of equation (1) using a finite element method. Note that, in the above equation (1), the coefficient of the term including the propagation constant β is referred to as a separation coefficient.

More specifically, the eigenmode calculation unit 21 sets a separation coefficient defined with the refractive index distribution and the propagation constant of the second waveguide 130 and the wavenumber of propagated light. In addition, the eigenmode calculation unit 21 sets a discretized finite element equation and sets a boundary condition. Specifically, the eigenmode calculation unit 21 assembles the finite element equation into a simultaneous equation based on the numbers of a discretized state function, and performs a matrix operation to determine the state function. The eigenmode of the second waveguide 130 determined by the eigenmode calculation unit 21 is used to calculate a coupling efficiency by the characteristics analysis unit 40, which will be described below.

The waveguide mode calculation unit 22 uses the shape and distribution of physical property values of the first waveguide 120 set by the first structure setting unit 11 to calculate a waveguide mode of the first waveguide 120. The waveguide mode of the first waveguide 120 means an electromagnetic field in which zeroth or higher order eigenmodes are combined when reflection does not occur on an end surface.

The first distribution calculation unit 23 and the second distribution calculation unit 24 calculate a distribution of an electromagnetic field of the boundary region of the optical connection structure 110. The first distribution calculation unit 23 calculates the distribution of the electric field of the optical connection structure 110. The second distribution calculation unit 24 calculates the distribution of a reference electric field which is a distribution of the electric field in which an electromagnetic field propagating toward the first waveguide 120 does not exist while including the optical element 140. That is, the distribution of the reference electric field is a distribution of an electric field in a case in which the optical element 140 does not include a structure for blocking traveling waves propagating from the first waveguide 120 toward the second waveguide 130.

Figure 3:
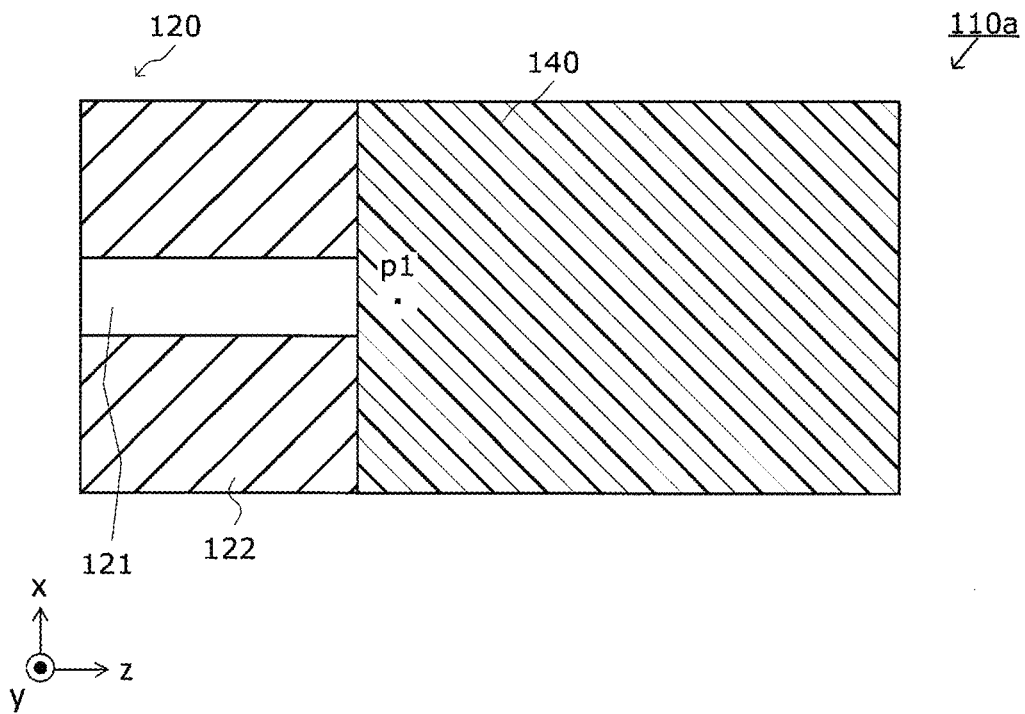
FIG. 3 is a schematic structure diagram for calculating a distribution of a reference electric field according to the present embodiment.

Specifically, the second distribution calculation unit 24 calculates a distribution of the reference electric field of an optical connection structure 110a constituted by the first waveguide 120 and the optical element 140 illustrated in FIG. 3. In the present embodiment, the optical element 140 of the optical connection structure 110a is a uniform medium and has a structure that does not cause a change in wavenumber.

The data extraction unit 30 extracts data including a mode distribution in a plane at a predetermined position of the optical connection structure 110 and a time response of the electromagnetic field from the distribution of electromagnetic field determined by the solution unit 20. The data extraction unit 30 includes a mode distribution extraction unit 31, a first response calculation unit 32, a second response calculation unit 33, and a third response calculation unit 34.

Figure 2:
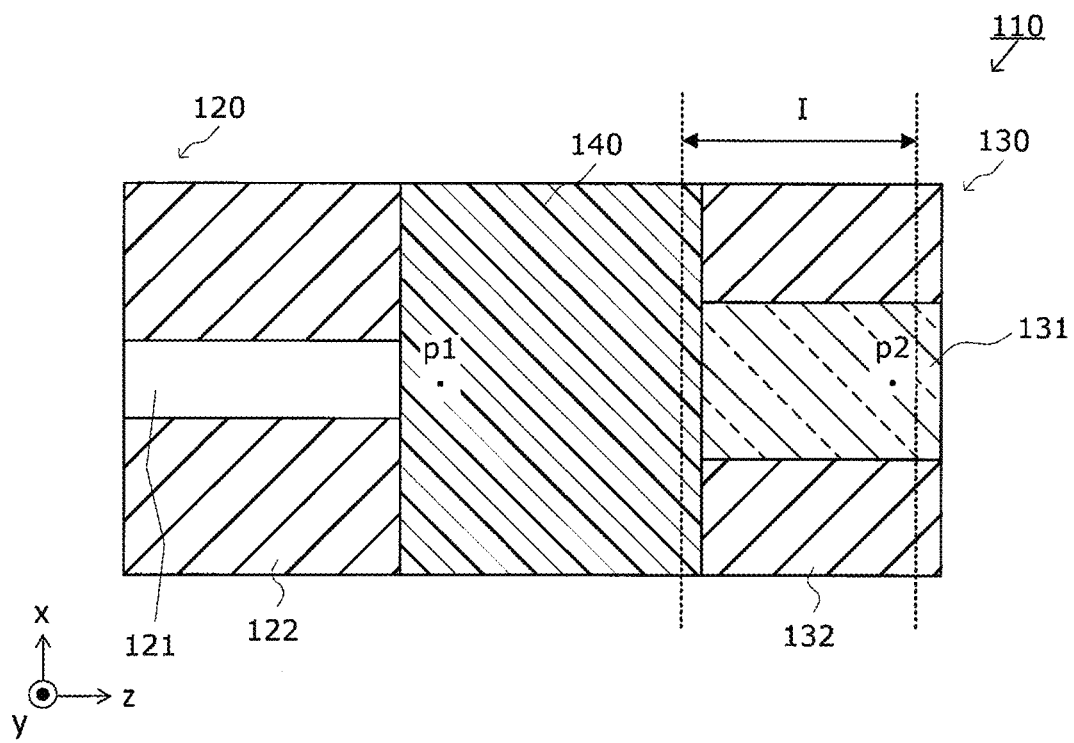
FIG. 2 is a schematic plan view illustrating an optical connection structure according to the present embodiment.

The mode distribution extraction unit 31 extracts a mode distribution of a specified reference section I of the optical connection structure 110 illustrated in FIG. 2 based on the distribution of the electric field of the optical connection structure 110 calculated by the first distribution calculation unit 23. Any cross section intersecting the optical axis of the second waveguide 130 may be used as the reference section I.

The first response calculation unit 32 determines the transient response of the electric field at first reference coordinates p1 of the optical connection structure 110 illustrated in FIG. 2. The first reference coordinates p1 are set within a region of the optical connection structure 110 including the optical element 140. For example, the first reference coordinates p1 are set to a position in the optical element 140 at which the optical axis intersects the optical element 140.

The second response calculation unit 33 determines a transient response of the electric field at second reference coordinates p2 of the optical connection structure 110 illustrated in FIG. 2. The second reference coordinates p2 are set in a region of the second waveguide 130. Further, the second reference coordinates p2 are set at a position in the second waveguide 130 intersecting the optical axis.

The third response calculation unit 34 determines a transient response of the reference electric field at the first reference coordinates p1 based on the distribution of the reference electric field calculated by the second distribution calculation unit 24.

The characteristics analysis unit 40 analyzes the optical characteristics of the optical element 140 based on the mode distribution extracted by the data extraction unit 30 and the time response of the electromagnetic field. Specifically, based on the distribution of the electric field extracted by the data extraction unit 30 and the eigenmode of the second waveguide 130 calculated by the eigenmode calculation unit 21, the characteristics analysis unit 40 calculates a coupling efficiency in any reference section I and a reflectance and a transmittance at any reference coordinates.

The characteristics analysis unit 40 includes a coupling efficiency calculation unit 41, a reflectance calculation unit 42, and a transmittance calculation unit 43.

The coupling efficiency calculation unit 41 calculates a coupling efficiency CE of the eigenmode and the mode distribution of the second waveguide 130 in any reference section I of the optical connection structure 110. The coupling efficiency CE indicates how much a distribution E of an electric field on any reference plane of the optical connection structure 110 matches the eigenmode Om of the first waveguide 120 or the second waveguide 130, and is obtained by calculating an overlap integral defined in equation (2). In equation (2), the optical axis of a waveguide and the z axis direction are assumed to be parallel, and the z coordinate of a point at which the reference plane and the optical axis intersect is set as $Z_{ref}$.

Math. 2

$$CE = \frac{\left|\int\int E(x, y, z_{ref}) \cdot \phi_m dx\, dy\right|^2}{\int\int |E(x, y, z_{ref})|^2 dx\, dy \cdot \int\int |\phi_m|^2 dx\, dy} \quad (2)$$

The reflectance calculation unit 42 calculates a reflectance at the first reference coordinates p1 based on the transient response of the reference electric field obtained by the third response calculation unit 34 and the transient response of the electric field at the first reference coordinates p1 in the optical connection structure 110 obtained by the first response calculation unit 32.

The transmittance calculation unit 43 calculates a transmittance based on the transient response of the reference electric field obtained by the third response calculation unit 34 and the transient response of the electric field at the second reference coordinates p2 in the optical connection structure 110 obtained by the second response calculation unit 33.

The evaluation unit 50 evaluates the structure of the optical element 140 set by the setting unit 10 based on the preset optical characteristics from the optical characteristics of the optical element 140 analyzed by the characteristics analysis unit 40. More specifically, the evaluation unit 50 determines whether the shape and physical property values of the optical element 140 of the optical connection structure 110 needs to be modified from the optical characteristics including the coupling efficiency, reflectance, and transmittance of the optical connection structure 110 output by the characteristics analysis unit 40.

The data storage unit 60 stores structural data of the optical connection structure 110 set by the setting unit 10. In addition, the data storage unit 60 stores the eigenmode, the waveguide mode, and the distribution of the electromagnetic field calculated by the solution unit 20. In addition, the data storage unit 60 stores the mode distribution, the transient response of the electric field, and the like extracted by the data extraction unit 30. In addition, the data storage unit 60 stores the coupling efficiency, the reflectance, and transmittance calculated by the characteristics analysis unit 40.

Hardware Configuration of Analysis Apparatus

Next, an example of a hardware configuration of the analysis apparatus 1 having the above-described functions will be described with reference to FIG. 4.

Figure 4:
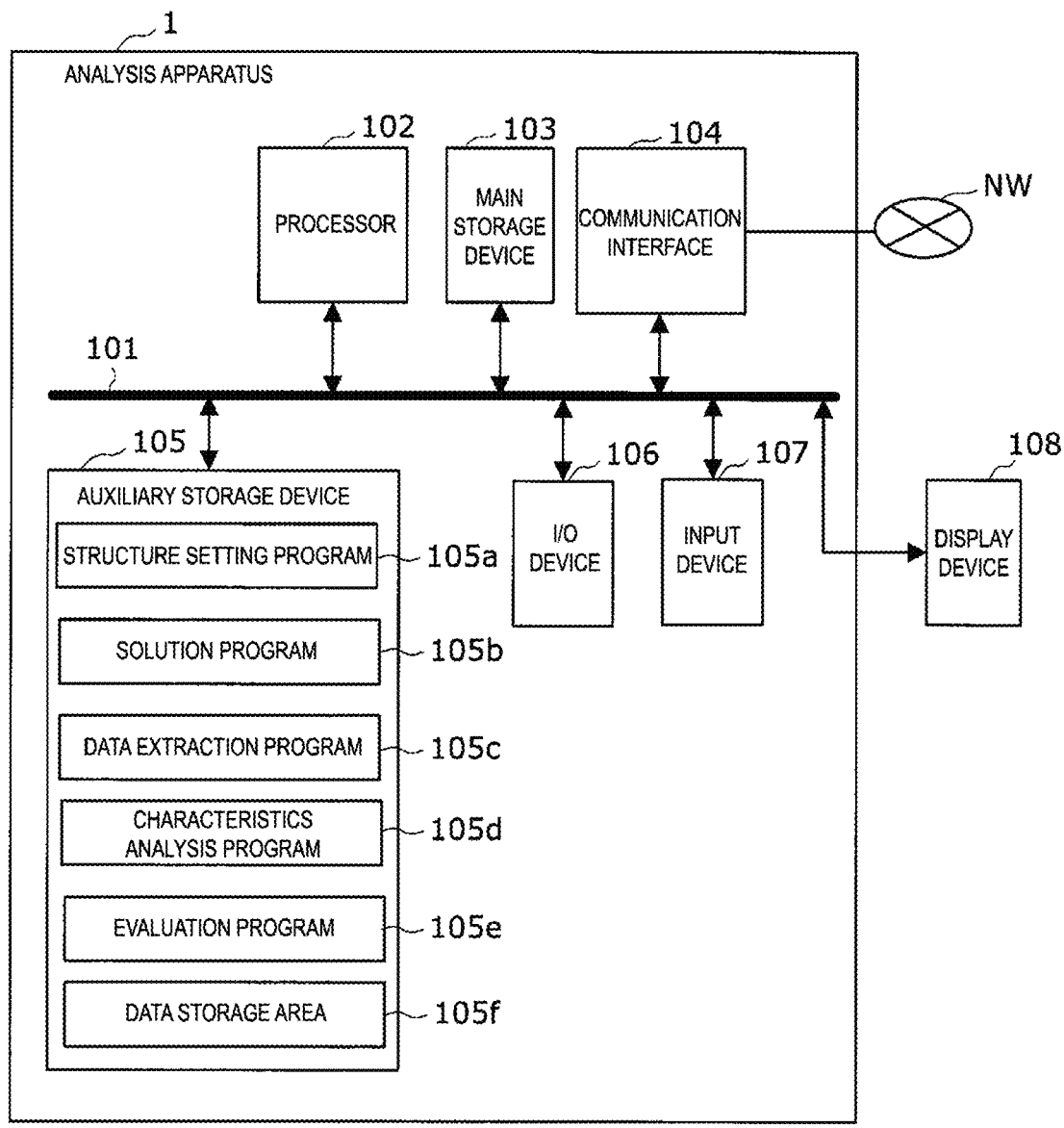
FIG. 4 is a block diagram illustrating a hardware configuration of the analysis apparatus according to the present embodiment.

As illustrated in FIG. 4, the analysis apparatus 1 can be implemented by a computer including a processor 102, a main storage device 103, a communication interface 104, an auxiliary storage device 105, an I/O device 106, and an input device 107 connected via a bus 101, and a program for controlling these hardware resources, for example. The analysis apparatus 1 may have a display device 108 connected via the bus 101, which displays, for example, analysis results and calculation processes of the analysis apparatus 1, such as, for example, structural data, coupling efficiency, reflectance, transmittance, and the like of the optical connection structure 110 on the display screen.

The main storage device 103 is implemented by a semiconductor memory, for example, an SRAM, a DRAM, and a ROM. A program used by the processor 102 to perform various types of control and calculation is stored in advance in the main storage device 103. The functions of the analysis apparatus 1 including the setting unit 10, the solution unit 20, the data extraction unit 30, the characteristics analysis unit 40, and the evaluation unit 50 illustrated in FIG. 1 are implemented by the processor 102 and the main storage device 103.

The communication interface 104 is an interface circuit for communicating with various types of external electronic equipment via a communication network NW. The analysis apparatus 1 may send the analysis results to outside via the communication interface 104.

Examples of the communication interface 104 include an interface and an antenna that comply with wireless data communication standards, for example, LTE, 3G, a wireless LAN, and Bluetooth (trade name). The communication network NW includes, for example, a wide area network (WAN), a local area network (LAN), the Internet, a dedicated line, a radio base station, a provider, and the like.

The auxiliary storage device 105 includes a readable/writable storage medium, and a drive device for reading and writing various kinds of information such as a program and data to and from the storage medium. A semiconductor memory such as a hard disk or a flash memory which serves as a storage medium can be used in the auxiliary storage device 105.

The auxiliary storage device 105 includes a program storage area in which a program used by the analysis apparatus 1 to perform the processing of analyzing the optical connection structure 110 is stored. Further, the auxiliary storage device 105 may include, for example, a backup area and the like for backing up the above-described data, programs, and the like.

The auxiliary storage device 105 stores, for example, a structure setting program 105a, a solution program 105b, a data extraction program 105c, a characteristics analysis program 105d, and an evaluation program 105e in the program storage area. In addition, the auxiliary storage device 105 has a data storage area 105f. The data storage area 105f implements the data storage unit 60 illustrated in FIG. 1.

The I/O device 106 includes an I/O terminal that receives input of a signal from an external device such as the display device 108 and outputs a signal to an external device.

The input device 107 includes a keyboard, a touch panel, or the like, and generates an input signal in accordance with a key press, a touch operation, or the like. The setting unit 10 illustrated in FIG. 1 sets the structural data of the optical connection structure 110 according to the input signal generated by the input device 107.

Note that the analysis apparatus 1 may be implemented by one single computer and also implemented by being distributed over a plurality of computers connected to each other through the communication network NW.

Analysis Method for Optical Connection Structure

Next, an operation of the analysis apparatus 1 with the above-described configuration will be described with reference to the flowchart of FIG. 5.

First, the setting unit 10 sets a mesh spacing of the optical connection structure 110 used by the solution unit 20 for calculation (step S1). Next, the setting unit 10 sets a shape and a distribution of physical property values of the optical connection structure 110 (step S2). More specifically, the first structure setting unit 11 sets a shape and a distribution of physical property values of the first waveguide 120. The second structure setting unit 12 sets a shape and a distribution of physical property values of the second waveguide 130. In addition, the third structure setting unit 13 sets a shape and a distribution of physical property values of the optical element 140. The mesh spacing and the shape and the distribution of the physical property values of the optical connection structure 110 set in step S1 and step S2 are stored in the data storage unit 60.

Next, the eigenmode calculation unit 21 calculates an eigenmode of the second waveguide 130 (step S3). Here, the processing of calculating the eigenmode of the second waveguide 130 will now be described with reference to FIG. 6.

Figure 6:
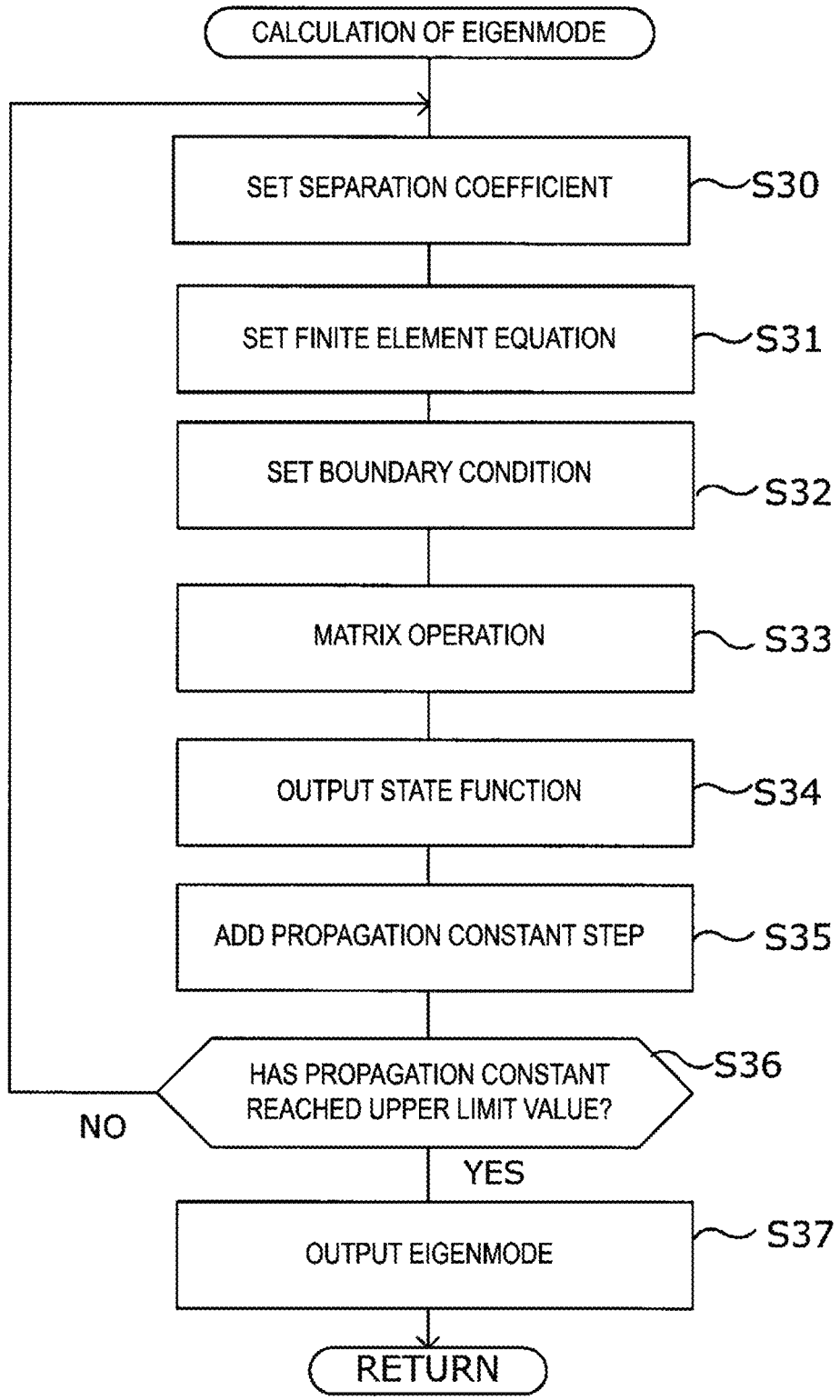
FIG. 6 is a flowchart for explaining eigenmode calculation processing.

First, the eigenmode calculation unit 21 sets a separation coefficient of the above-described equation (1) defined based on the refractive index distribution and the propagation constant of the second waveguide 130 and the wavenumber of propagating light as illustrated in FIG. 6 (step S3). Next, the eigenmode calculation unit 21 sets a discretized finite element equation based on equation (1) (step S31). Next, the eigenmode calculation unit 21 sets a boundary condition (step S32). Then, the eigenmode calculation unit 21 assembles the set finite element equation into a simultaneous equation based on the number of discretized state functions to perform a matrix operation (step S33).

The eigenmode calculation unit 21 obtains and outputs state functions through the matrix operation (step S34). The output state functions are stored in the data storage unit 60. Then, the eigenmode calculation unit 21 adds the step of a propagation constant β of equation (1) (step S35). Then, the processing operations from step S30 to step S35 are repeated until the propagation constant β reaches an upper limit value (NO in step S36). If the propagation constant β reaches the upper limit value (YES in step S36), the eigenmode calculation unit 21 outputs the eigenmode (step S37).

More specifically, the eigenmode calculation unit 21 obtains a spectrum indicating a relationship between the state function and the propagation constant, selects one or more specific peaks from the spectrum, and outputs the peaks as eigenmodes $\varphi_m$ (m is an integer greater than or equal to 0). Note that the eigenmodes are referred to as a zeroth order mode (m=0), a primary mode (m=1), and the like in descending order of eigenmodes with higher propagation constants. Note that, instead of adding the value of the propagation constant in step S35, the eigenmode calculation unit 21 may subtract the value of the propagation constant and repeat the processing operations from step S30 to step S34 until the propagation constant reaches a lower limit value. Then, the processing transitions to step S9 of FIG. 5.

Figure 5:
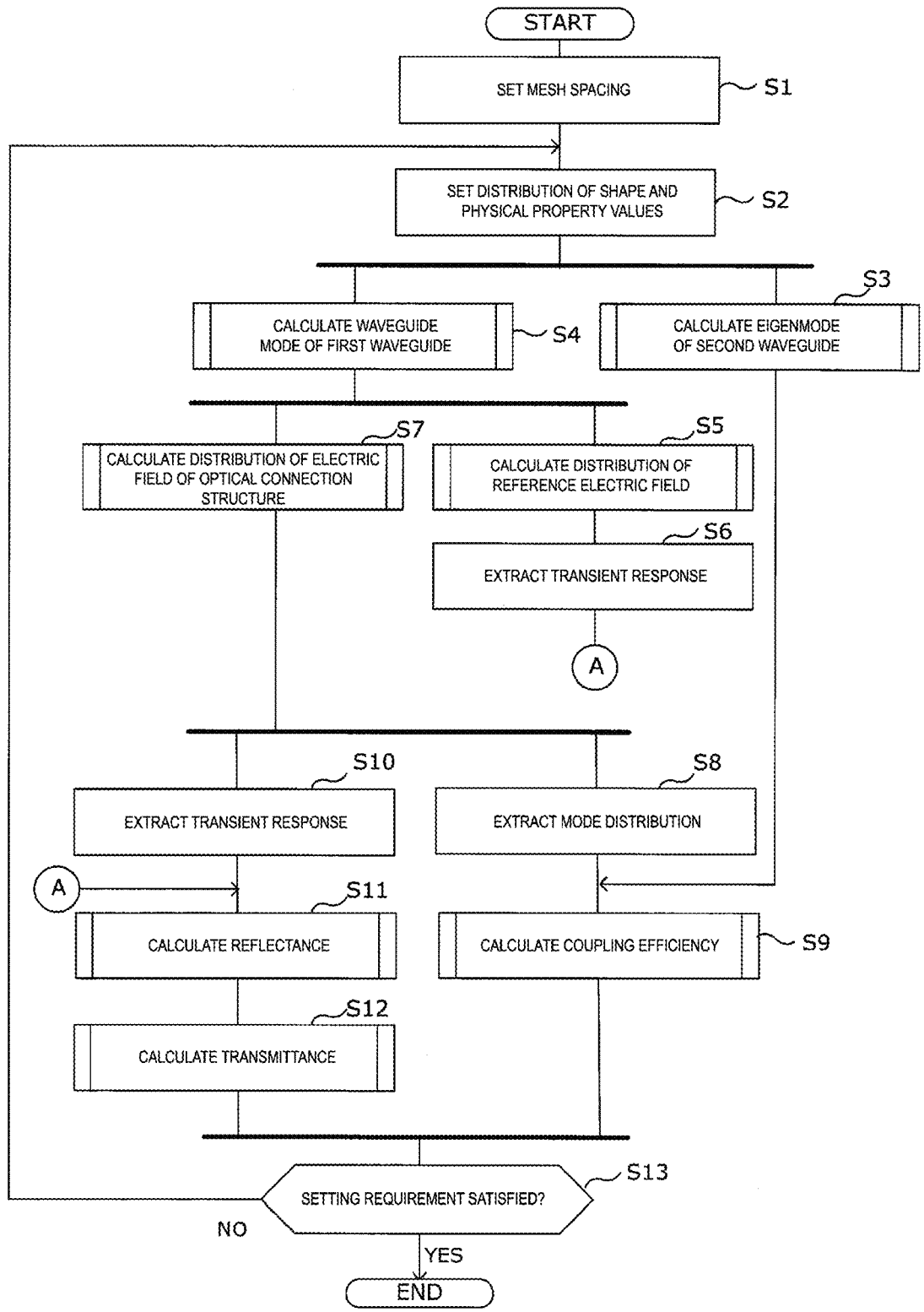
FIG. 5 is a flowchart for explaining an analysis method for the optical connection structure according to the present embodiment.

The waveguide mode calculation unit 22 calculates a waveguide mode of the first waveguide 120 after step S2 as illustrated in FIG. 5 (step S4). Here, the processing of calculating the waveguide mode will now be described with reference to FIG. 7.

Figure 7:
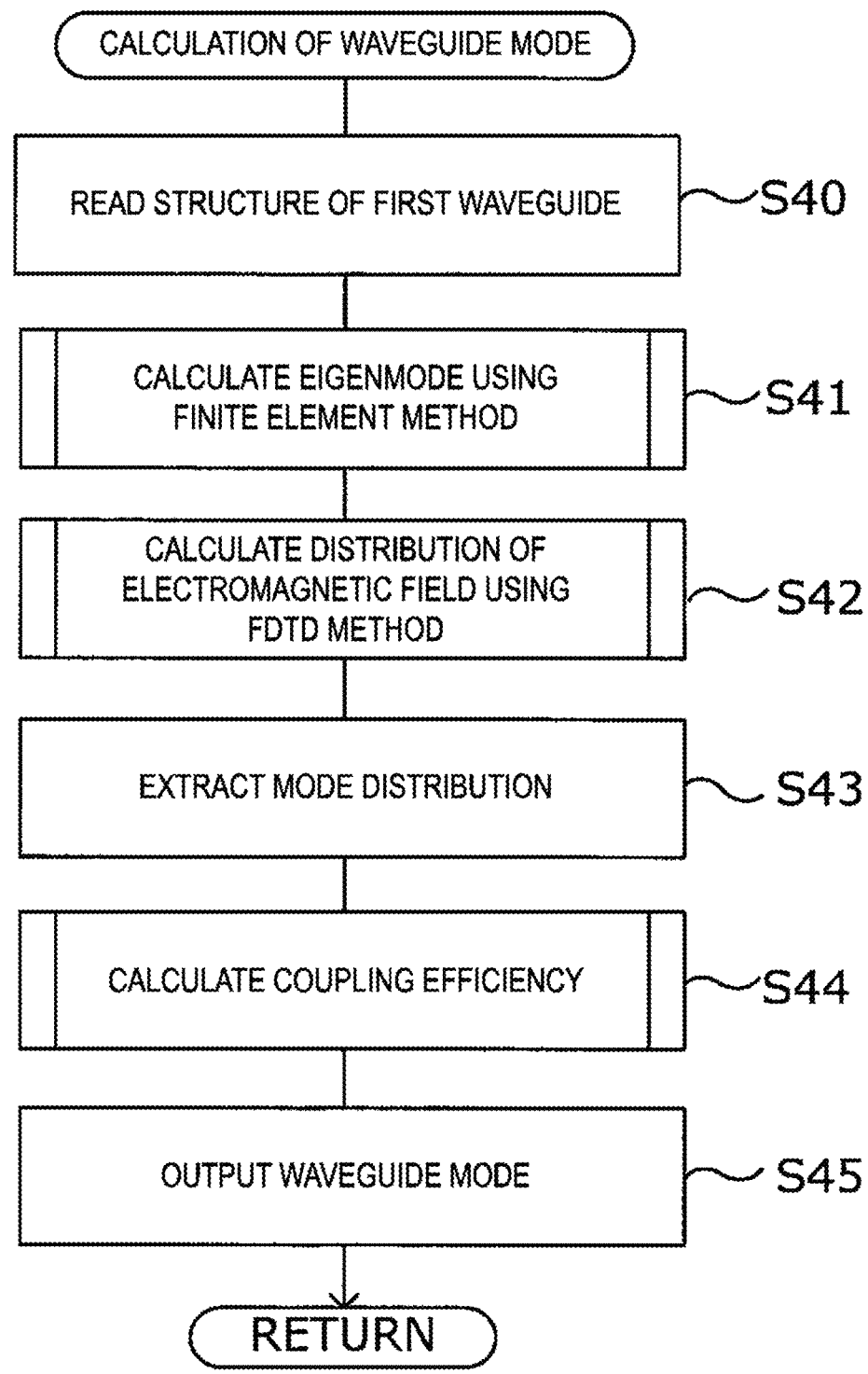
FIG. 7 is a flowchart for explaining waveguide mode calculation processing.

The waveguide mode calculation unit 22 reads the shape and the distribution of the physical property values of the first waveguide 120 stored in the data storage unit 60 as illustrated in FIG. 7 (step S40). Next, the waveguide mode calculation unit 22 calculates an eigenmode of the first waveguide 120 using the finite element method (step S41).

Figure 12A:
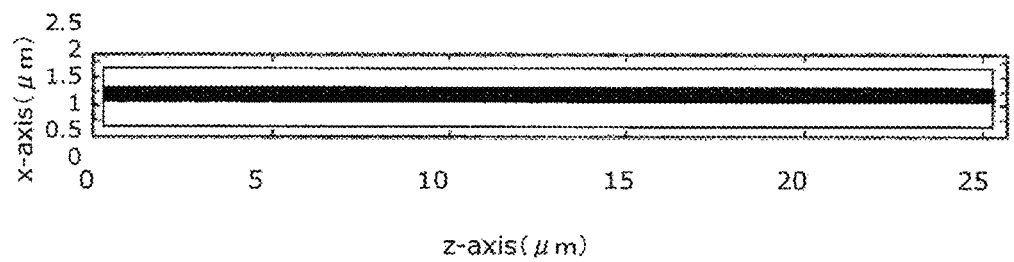
FIG. 12A is a diagram illustrating a structure of a first waveguide.
Figure 13:
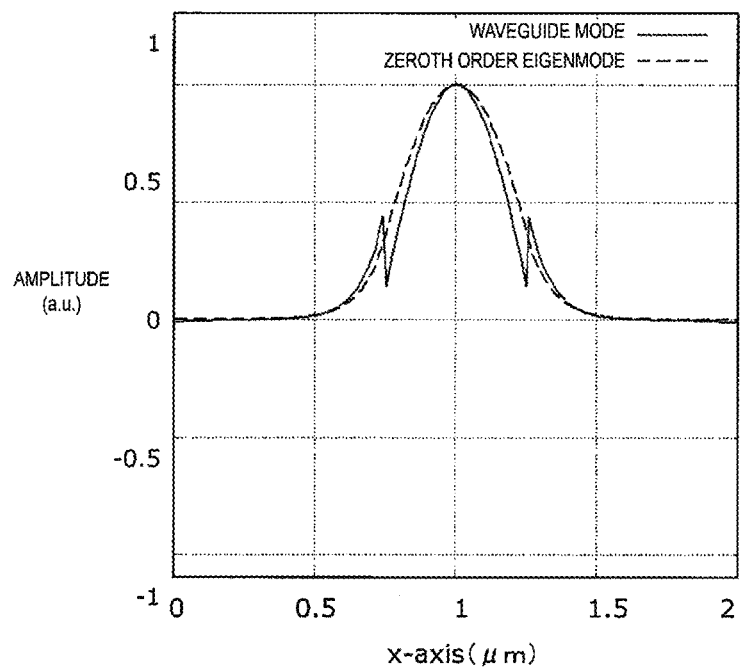
FIG. 13 is a graph showing an example of a waveguide mode of the first waveguide.

More specifically, the waveguide mode calculation unit 22 calculates an eigenmode EIG1 of the first waveguide 120 indicated by the dashed line in FIG. 13 using the finite element method described above based on the structure of the first waveguide 120 illustrated in FIG. 12A. The waveguide mode calculation unit 22 calculates the eigenmode EIG1 in a procedure similar to the eigenmode calculation processing described in FIG. 6. Note that FIG. 13 illustrated an example in which a zeroth order eigenmode is obtained.

Next, the waveguide mode calculation unit 22 calculates a distribution EH1 of an electric field of the first waveguide 120 using a finite-difference time-domain (FDTD) method which is an electromagnetic field analysis method (step S42). The FDTD method is a method in which a Maxwell's equation is differentiated in time and space to determine a distribution of an electric field in the time domain.

Figure 12B:
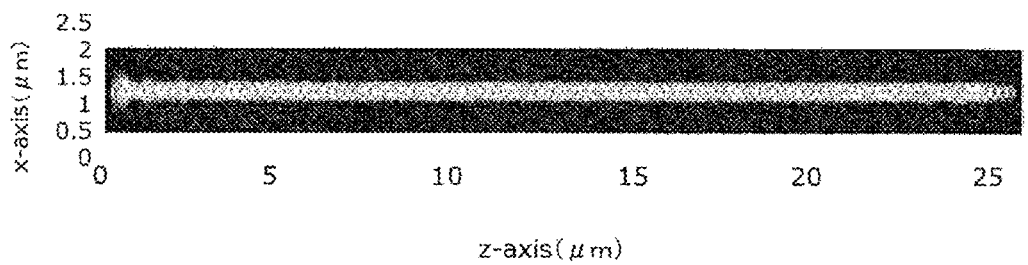
FIG. 12B is a diagram illustrating an example of a distribution of an electric field of the first waveguide.

Specifically, the waveguide mode calculation unit 22 applies the eigenmode EIG1 of the first waveguide 120 obtained using the finite element method to the light source to determine a distribution EH1 of an electric field illustrated in FIG. 12B using the FDTD method. Note that the calculation processing for the distribution of the electromagnetic field using the FDTD method used in step S42 will be described in detail below.

The waveguide mode calculation unit 22 obtains a waveguide mode distribution Mk in a predetermined designated section along a direction perpendicular to the optical axis of the first waveguide 120 from the distribution EH1 of the electric field of the first waveguide 120 calculated using the FDTD method (step S43). Here, k denotes an identification number of coordinates in the section in which the waveguide mode distribution is extracted. The waveguide mode calculation unit 22 may obtain the waveguide mode distribution Mx in the predetermined designated section along the plane perpendicular to the optical axis of the first waveguide 120. The solid line in FIG. 13 indicates an example of the waveguide mode distribution Mk of the first waveguide 120 extracted by the waveguide mode calculation unit 22.

For example, in the calculation of the eigenmode in the related art described in Patent Literature 1, there is no step in the modes taking place when the difference in refractive indexes between the core and the cladding of the waveguide is large. In the waveguide mode calculation unit 22 according to the present embodiment, by obtaining the waveguide mode distribution of the first waveguide 120 using the FDTD method, a mode reflecting the difference in refractive indexes is calculated.

Figure 14:
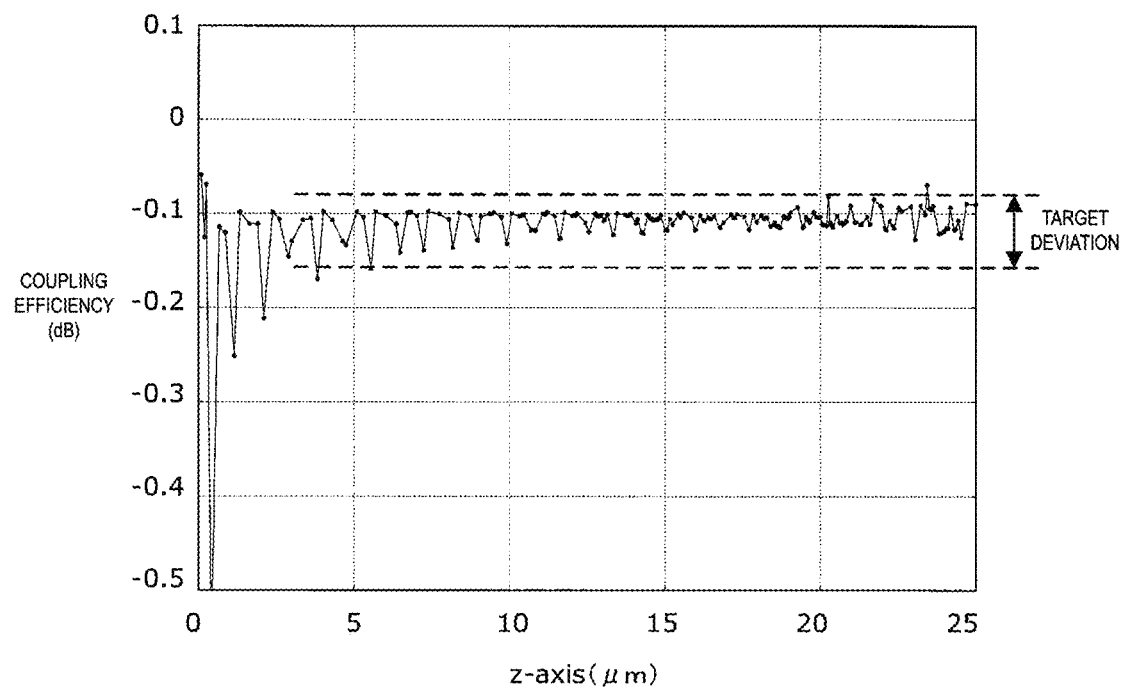
FIG. 14 is a graph for describing dependency of the coupling efficiency of the first waveguide at the position of a reference plane.

The waveguide mode calculation unit 22 calculates a coupling efficiency between the eigenmode EIG1 and the waveguide mode Mx of the first waveguide 120 to select a solution to a more stable waveguide mode (step S44). The waveguide mode calculation unit 22 obtains the relationship between the coupling efficiency and the position of the first waveguide 120 in the z axis direction as illustrated in FIG. 14. In addition, the waveguide mode calculation unit 22 selects and outputs a waveguide mode Ms corresponding to a coupling efficiency within a preset target deviation (the arrow in FIG. 14). The calculation processing for the coupling efficiency by the waveguide mode calculation unit 22 will be described in detail below.

Next, the waveguide mode calculation unit 22 outputs the waveguide mode of the first waveguide 120 (step S45). Then, the processing transitions to step S5 and step S7 of FIG. 5.

Next, the second distribution calculation unit 24 calculates a distribution of a reference electric field of the optical connection structure 110a on the assumption that there is no electromagnetic field propagating towards the first waveguide 120 as illustrated in FIG. 5 (step S5). The first distribution calculation unit 23 calculates the distribution of the electric field of the optical connection structure 110 (step S7).

Here, the electromagnetic field distribution calculation processing in step S5, step S7, and step S42 (FIG. 7) will be described with reference to FIG. 8.

Figure 8:
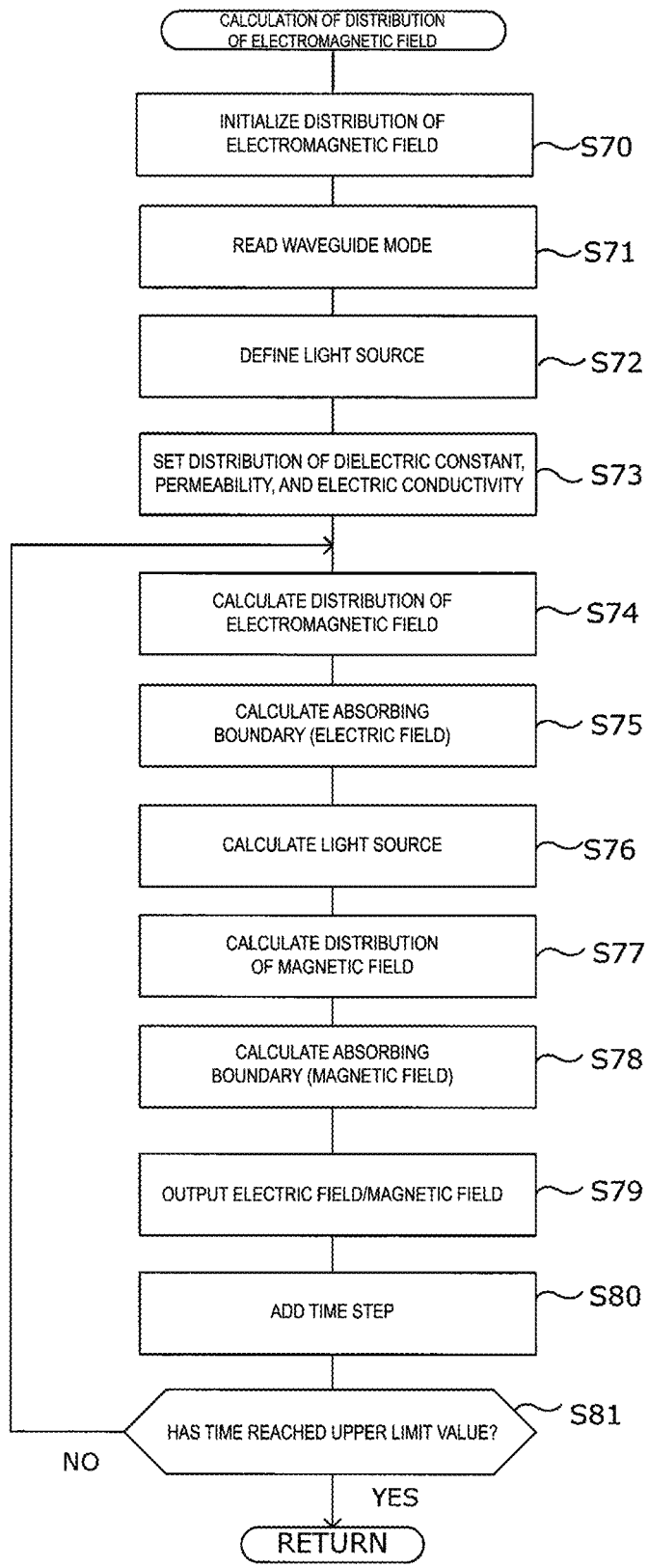
FIG. 8 is a flowchart for explaining electromagnetic field distribution calculation processing.

In the electromagnetic field distribution calculation processing illustrated in FIG. 8, processing of the first distribution calculation unit 23 to calculate the distribution of the electromagnetic field of the optical connection structure 110 in step S7 is described as an example. First, the first distribution calculation unit 23 initializes the electric field and the magnetic field of the optical connection structure 110 (step S70).

On the premise that a mesh spacing applied in the calculation of the waveguide mode of the first waveguide 120 matches a mesh spacing applied to the FDTD method, the first distribution calculation unit 23 reads a waveguide mode Ms of the first waveguide 120 from the data storage unit 60 (step S71).

Next, the first distribution calculation unit 23 defines the light source (step S72). Specifically, assuming the optical axis of the first waveguide 120 is parallel to the z axis direction, and the distribution of the electric field at coordinates at which a light source polarized in the x axis direction is set is defined in equation (3) below.

Math. 3

$$E_x^{n+1}(i,j,ks) = E_x^n(i,j,ks) + Ms \cdot \sin(\omega \cdot n\Delta t) \qquad (3)$$

In equation (3), $E_x$ represents an electric field vector component in the x axis direction, n (n=0, 1, 2, . . . ) represents a discretized time step, and i and j represent discretized coordinate components in the x and y axis directions, respectively. ks represents any z-axis coordinates of the first waveguide 120 on the optical axis. The second term on the right side of the above equation (3) represents an excitation source oscillating with a sine wave or cosine wave in time n$\Delta$t, the coefficient w represents an angular oscillation frequency, and $\Delta$t represents a time interval.

A light source of this type is referred to as a soft source, and on the other hand, a light source consisting of a term of only an excitation source is referred to as a hard source. Hard sources are not employed as normal light sources because they do not allow other waves to pass through at their own coordinates and give an inconvenient solution in light of an actual phenomenon. Soft sources are desirable as normal light sources because they allow other waves to pass through and non-interfering.

Then, the first distribution calculation unit 23 sets a distribution of the dielectric constants, permeabilities, and electric conductivities of the optical connection structure 110 so that the central axis of the light source defined in step S52 coincides with the central axis of the core 121 of the first waveguide 120 (step S73).

Next, the first distribution calculation unit 23 calculates the distribution of the electric field according to the Yee algorithm (step S74). In the Yee algorithm, an analysis region is divided into calculation grids that are called Yee grids in which the electric field and magnetic field are shifted by a half grid to calculate the Maxwell equation.

Then, the first distribution calculation unit 23 applies a perfectly matched layer (PML) absorbing boundary condition or a Mur absorbing boundary condition to the outer circumference of the region and calculates the electric field of the boundary region (step S75). Next, the first distribution calculation unit 23 updates the electric field at the coordinates (i, j, ks) at which the light source is set according to the above equation (3) (step S76).

Then, if the magnetic field is to be obtained, the following steps S77 and S78 may be performed. Specifically, the distribution of the magnetic field is calculated in accordance with the Yee algorithm similarly to the electric field (step S77). Next, the PML absorbing boundary condition or the Mur absorbing boundary condition is applied to the outer circumference of the region to calculate the magnetic field of the boundary region (step S78).

Then, the first distribution calculation unit 23 outputs the calculated electric field (step S79). Note that, if the magnetic field has been calculated, the magnetic field is output in step S79.

Next, the second distribution calculation unit 24 adds the time step (step S80). Then, the processing operations from step S74 to step S79 are repeated until the time reaches an upper limit value (NO in step S81). If the time reaches the upper limit value (YES in step S81), the processing returns to the processing of FIG. 5.

Here, the second distribution calculation unit 24 calculates the distribution of the reference electric field (step S5) based on the electromagnetic field distribution calculation processing described above, the third response calculation unit 34 extracts a transient response of the reference electric field from the distribution of the reference electric field (step S6) as illustrated in FIG. 5. Then, the processing transitions to step S11.

On the other hand, after the first distribution calculation unit 23 calculates the distribution of the electric field of the optical connection structure 110 in step S7, the mode distribution extraction unit 31 extracts the mode distribution of the reference section I illustrated in FIG. 2 (step S8). Then, the coupling efficiency calculation unit 41 calculates the coupling efficiency of the optical connection structure 110 (step S9).

Figure 9:
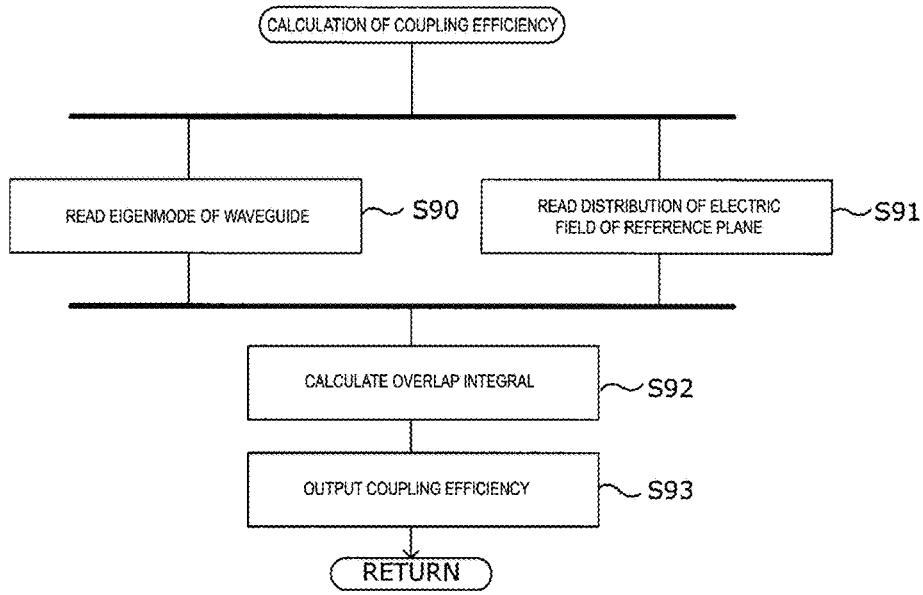
FIG. 9 is a flowchart for explaining coupling efficiency calculation processing.

FIG. 9 is a flowchart illustrating calculation processing for coupling efficiency (step S9). Note that the coupling efficiency is calculated in the similar procedure in the waveguide mode calculation processing (FIG. 7) (step S44 in FIG. 7).

First, the coupling efficiency calculation unit 41 reads the eigenmode Om of the second waveguide 130 from the data storage unit 60 (step S90) as illustrated in FIG. 9. On the other hand, the coupling efficiency calculation unit 41 reads the distribution of the electric field on any reference plane of the optical connection structure 110 from the data storage unit 60 (step S91). Note that the distribution of the electric field of the optical connection structure 110 is the value calculated by the first distribution calculation unit 23 in step S7.

Next, the coupling efficiency calculation unit 41 calculates the overlap integral defined in equation (2) described above (step S92). Then, the coupling efficiency calculation unit 41 outputs the calculated coupling efficiency (step S93). Then, the processing transitions to step S13 of FIG. 5.

After the distribution of the electric field of the optical connection structure is calculated in step S7, the transient responses of the electric fields at the first reference coordinates p1 and the second reference coordinates p2 are determined (step S10) as illustrated in FIG. 5. Next, the reflectance calculation unit 42 calculates the reflectance based on the transient response of the reference electric field calculated in step S6 and the transient response of the electric field at the first reference coordinates p1 (step S11). Then, the transmittance calculation unit 43 calculates the transmittance of the optical connection structure 110 based on the transient response of the electric field at the second reference coordinates p2 (step S12).

Figure 10:
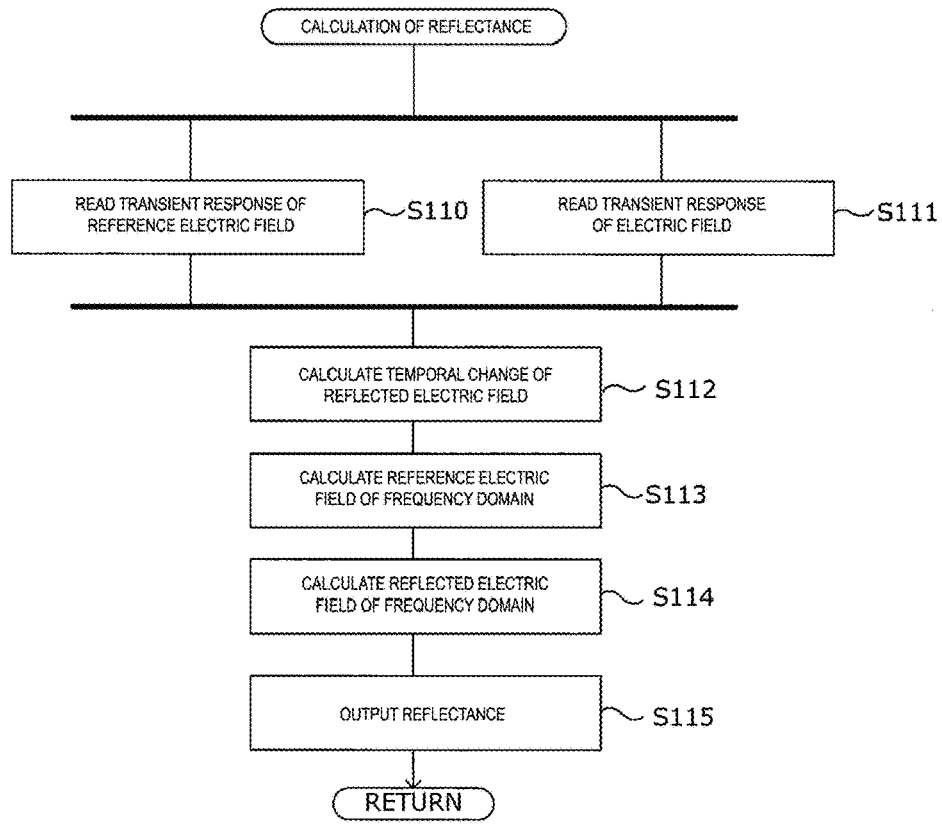
FIG. 10 is a flowchart for explaining reflectance calculation processing.

Here, processing of the reflectance calculation unit 42 to calculate the reflectance of the optical connection structure 110 will be described with reference to FIG. 10.

The reflectance calculation unit 42 reads the transient response of the reference electric field from the data storage unit 60 (step S110). In addition, the reflectance calculation unit 42 reads the transient response of the electric field of the first reference coordinates p1 from the data storage unit 60 (step S111).

Then, the reflectance calculation unit 42 calculates the temporal change $E_{ref}(t)$ of the reflected electric field (step S112). More specifically, the reflectance calculation unit 42 obtains the difference $E_{ref}(t)$ between the transient response E1$_{tot}$(t) of the electric field at the first reference coordinates p1 and the transient response E$_{inc}$(t) of the reference electric field (E$_{ref}$(t)=E1$_{tot}$(t)−E$_{inc}$(t)).

Next, the reflectance calculation unit 42 calculates the reference electric field F$_{inc}$(ω) of the frequency domain (step S113). Specifically, the reflectance calculation unit 42 performs a Fourier transform on the transient response E$_{inc}$(t) of the reference electric field in a predetermined time section (t$_{ref}$1<t<t$_{ref}$2) to obtain the reference electric field F$_{inc}$(ω) of the frequency domain.

Next, the reflectance calculation unit 42 calculates the reflected electric field of the frequency domain (step S114). More specifically, the reflectance calculation unit 42 sets a time section similar to that of step S113 as a calculation section and performs a Fourier transform on the temporal change E$_{ref}$(t) of the reflected electric field to obtain the electric field F$_{ref}$(ω) of the frequency domain. Thereafter, the reflectance calculation unit 42 outputs the ratio of the peak value F$_{ref\_p}$ of the electric field F$_{ref}$(ω) of the frequency domain to the peak value F$_{inc\_p}$ of the reference electric field F$_{inc}$(ω) of the frequency domain, i.e., the reflectance R=F$_{ref\_p}$/F$_{inc\_p}$ (step S115). Then, the processing transitions to step S12 of FIG. 5. Note that the reference electric field F$_{inc}$(ω), the electric field F$_{ref}$(ω), and the reflectance R of the frequency domain calculated in each step are stored in the data storage unit 60.

Figure 11:
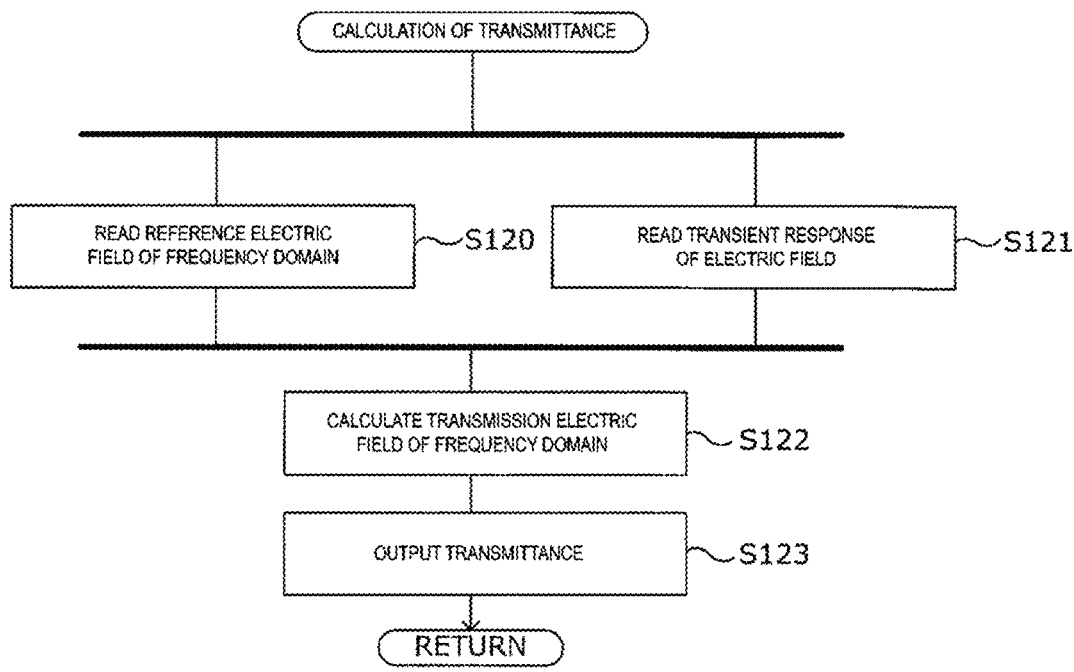
FIG. 11 is a flowchart for explaining transmittance calculation processing.

Next, the transmittance calculation processing executed by the transmittance calculation unit 43 (step S12 in FIG. 5) will be described in detail with reference to FIG. 11.

First, the transmittance calculation unit 43 reads the reference electric field F$_{inc}$(ω) of the frequency domain calculated in the reflectance calculation processing (step S113 in FIG. 10) from the data storage unit 60 (step S120). In addition, the transmittance calculation unit 43 reads a transient response E2$_{tot}$(t) of the electric field at the second reference coordinates p2 from the data storage unit 60 (step S121).

Then, the transmittance calculation unit 43 calculates the transmission electric field F$_{trn}$(ω) of the frequency domain (step S122). Specifically, the transmittance calculation unit 43 performs a Fourier transform on a transient response E2$_{tot}$(t) of the electric field at the second reference coordinates p2 to a temporal change E$_{trn}$(t) of the transmission electric field in a predetermined time section (t$_{trn}$1<t<t$_{trn}$2) to obtain the transmission electric field F$_{trn}$(ω) of the frequency domain.

Thereafter, the transmittance calculation unit 43 outputs the transmittance (step S123). More specifically, the transmittance calculation unit 43 outputs the ratio of the peak value F$_{trn\_p}$ of the transmission electric field F$_{trn}$(ω) of the frequency domain to the peak value F$_{inc\_p}$ of the reference electric field F$_{inc}$(ω) of the frequency domain, i.e., the transmittance T=F$_{trn\_p}$/F$_{inc\_p}$. Then, the processing transitions to step S13 of FIG. 5.

If the evaluation unit 50 determines that the shape and physical property values of the optical element 140 of the optical connection structure 110 needs to be modified based on a requirement related to the characteristics of the optical element 140 set in advance (NO in step S13) as illustrate in FIG. 5, the processing operations from step S2 to step S12 are repeated. On the other hand, if the evaluation unit 50 determines that the shape and physical property values of the optical element 140 do not need to be modified (YES in step S13), the processing ends.

More specifically, the evaluation unit 50 determines whether the shape and physical property values of the optical element 140 need to be modified depending on whether the desired coupling efficiency, reflectance, and transmittance of the optical connection structure 110 are satisfied from the coupling efficiency calculated in step S9, the reflectance calculated in step S11, and the transmittance calculated in step S12. The analysis apparatus 1 performs analysis of the optical connection structure 110 through the above-described processing operations.

Specific Example

Figure 15:
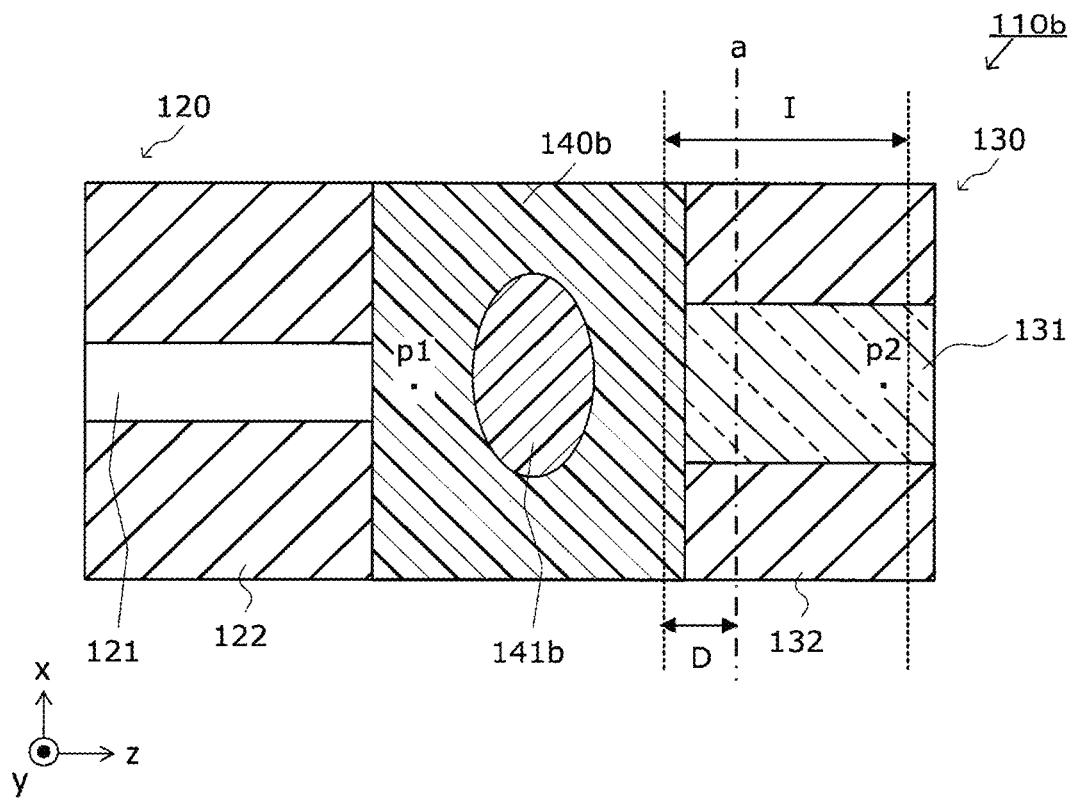
FIG. 15 is a schematic plan view illustrating an optical connection structure according to a specific example of the present embodiment.

Next, a specific example in which the analysis apparatus 1 according to the present embodiment analyzes an optical connection structure 110b illustrated in FIG. 15 will be described.

First, a configuration of the optical connection structure 110b to be analyzed by the analysis apparatus 1 will be described. As illustrated in FIG. 15, the optical connection structure 110b includes a first waveguide 120, a second waveguide 130, and an adhesive layer 140b which is an optical element connecting these waveguides.

The first waveguide 120 is formed of, for example, an embedded Si waveguide. The first waveguide 120 includes a core 121 and a cladding 122 covering the core 121.

The second waveguide 130 uses an optical fiber formed of a quartz-based material. The second waveguide 130 includes a core 131 of optical fibers and a cladding 132 formed to cover the core 131.

The adhesive layer 140b is formed such that the end surfaces facing the first waveguide 120 and the second waveguide 130 to each other are filled with an adhesive formed of a resin material such as an epoxy resin, an acrylic resin, or the like, for example. The adhesive layer 140b has a lens 141b formed on the optical axis of the first waveguide 120 and the second waveguide 130. The lens 141b is formed of a spherical lens that is convex along the optical axis. The lens 141b is formed of a resin material. Note that the adhesive layer 140b is formed to have a smaller refractive index than the lens 141b.

The region of the optical connection structure 110b is assumed to be a slab waveguide with no change in refractive index in the x axis direction. In addition, first reference coordinates p1 are set on the optical axis in the region of the adhesive layer 140b. Second reference coordinates p2 are set on the optical axis in the region of the second waveguide 130.

Figure 16A:
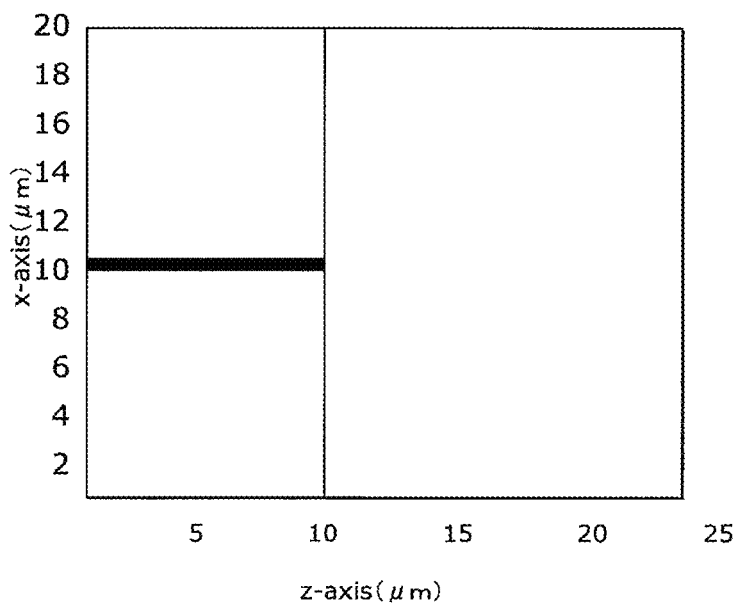
FIG. 16A is a schematic structure diagram for calculating a distribution of a reference electric field according to the specific example.
Figure 16B:
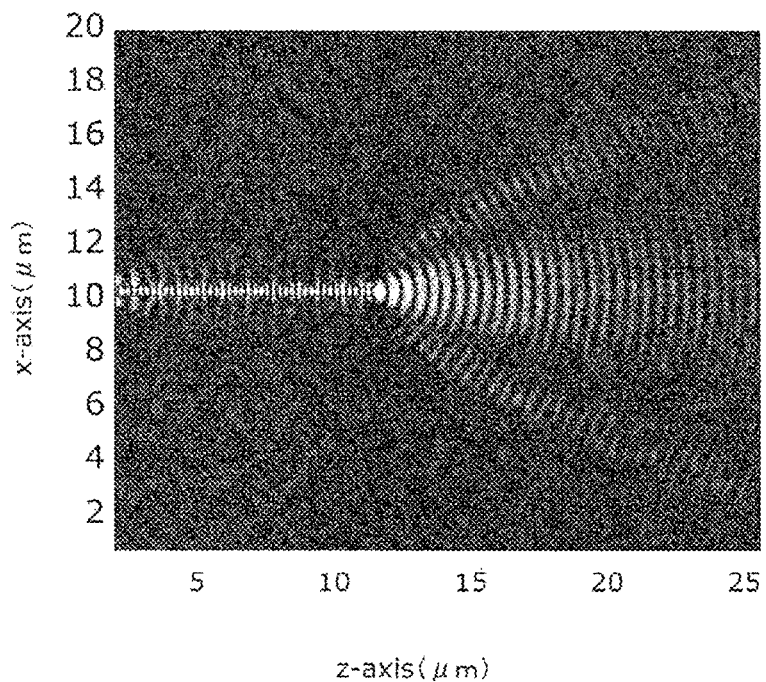
FIG. 16B is a diagram illustrating a distribution of a reference electric field according to the specific example.

FIG. 16A illustrates a structure of a region of the optical connection structure 110b for calculating a distribution of the reference electric field. In addition, FIG. 16B illustrates a distribution of the reference electric field of the optical connection structure 110b calculated by the second distribution calculation unit 24. Note that FIG. 16B illustrates a square distribution of the electric field. The reference electric field is calculated in a structure including the first waveguide 120 and only the adhesive layer 140b without the lens 141b. That is, a distribution of the electric field in the case in which the adhesive layer 140b serving as an optical element does not include a structure in which traveling waves propagating from the first waveguide 120 toward the second waveguide 130 are blocked is calculated as the distribution of the reference electric field.

Figure 17:
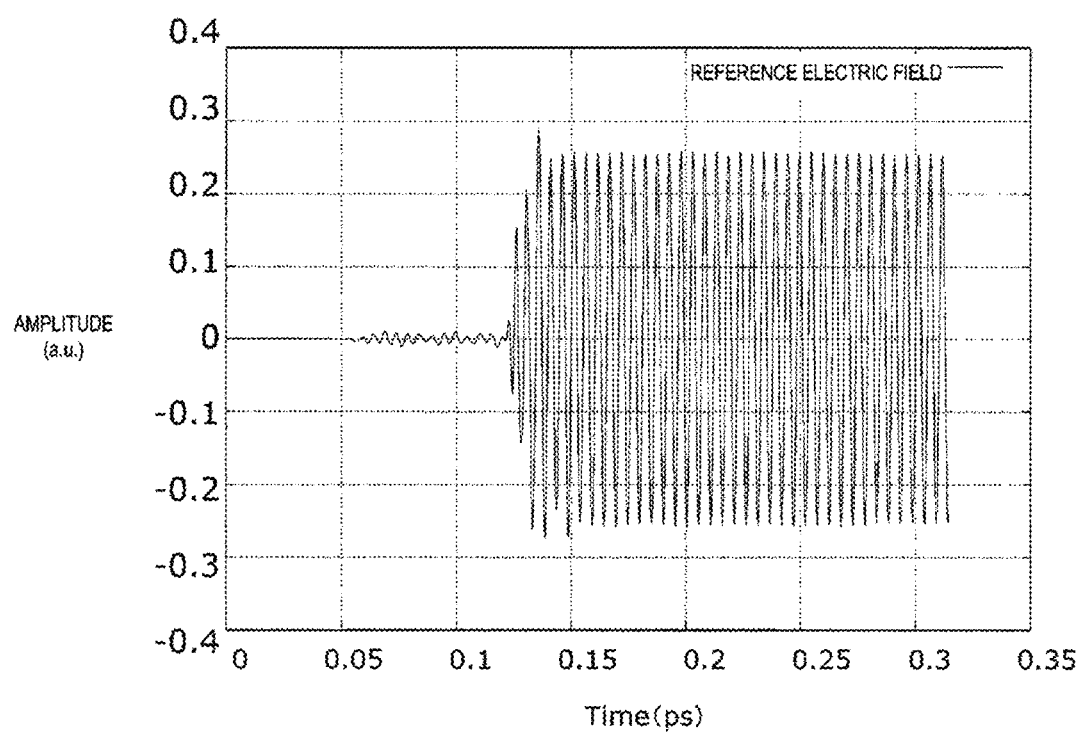
FIG. 17 is a graph showing a transient response of the reference electric field.

The transient response of the reference electric field at the first reference coordinates p1 set for the adhesive layer 140b of the optical connection structure 110b obtained by the third response calculation unit 34 is illustrated in FIG. 17. In FIG. 17, the horizontal axis represents time and the vertical axis represents amplitude.

Figure 18A:
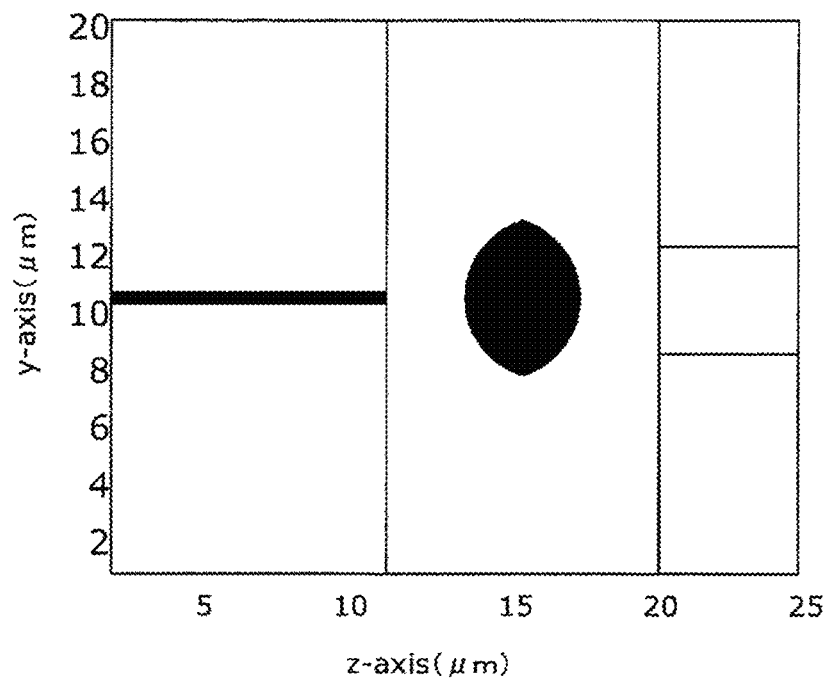
FIG. 18A is a diagram illustrating an optical connection structure.
Figure 18B:
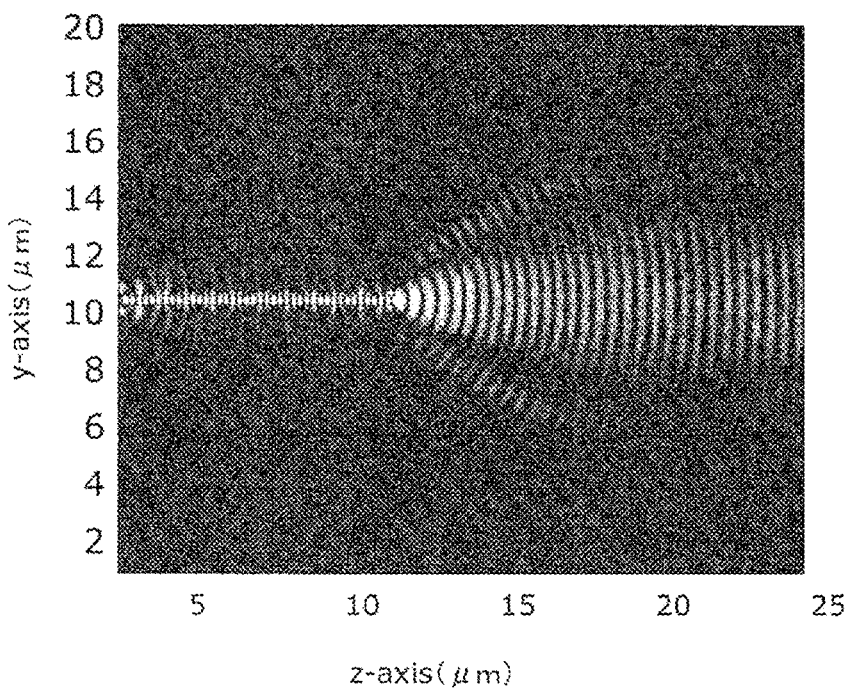
FIG. 18B is a diagram illustrating a distribution of an electric field of the optical connection structure.

Next, FIG. 18A illustrates a structure of a region of the optical connection structure 110b. FIG. 18B illustrates a distribution of the electric field of the optical connection structure 110b of FIG. 18A calculated by the first distribution calculation unit 23. Note that FIG. 18B illustrates a square distribution of the electric field.

Figure 19:
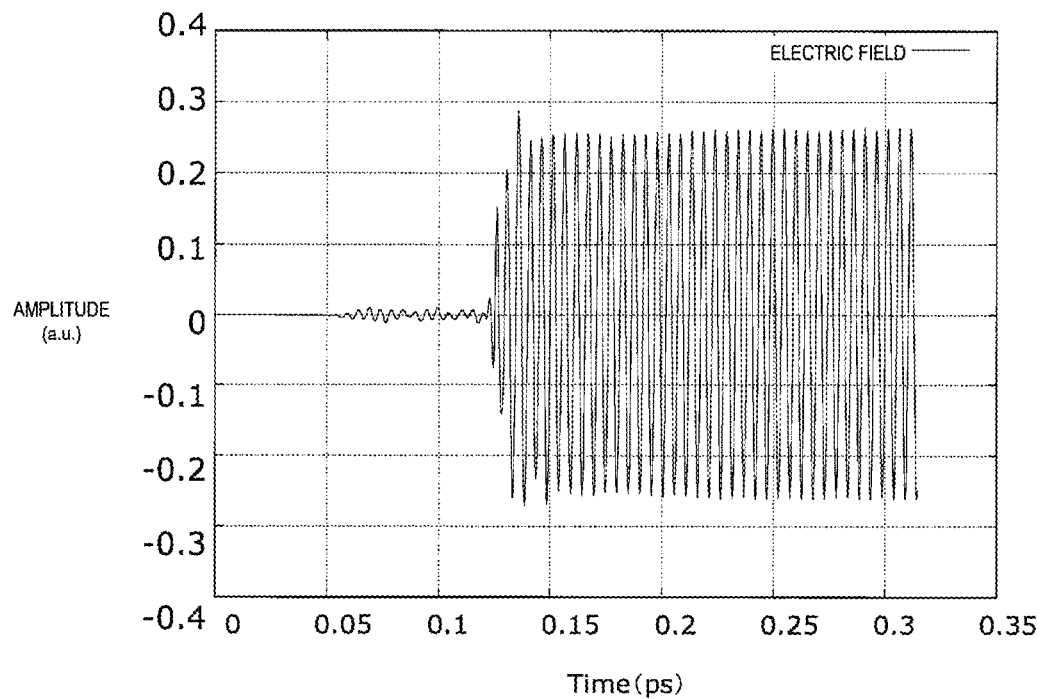
FIG. 19 is a graph showing a transient response of an electric field at first reference coordinates.

Next, FIG. 19 illustrates a transient response of the electric field at the first reference coordinates p1 in the optical connection structure 110b obtained by the first response calculation unit 32 based on the distribution of the electric field output by the first distribution calculation unit 23. In FIG. 19, the horizontal axis represents time and the vertical axis represents amplitude.

Figure 20:
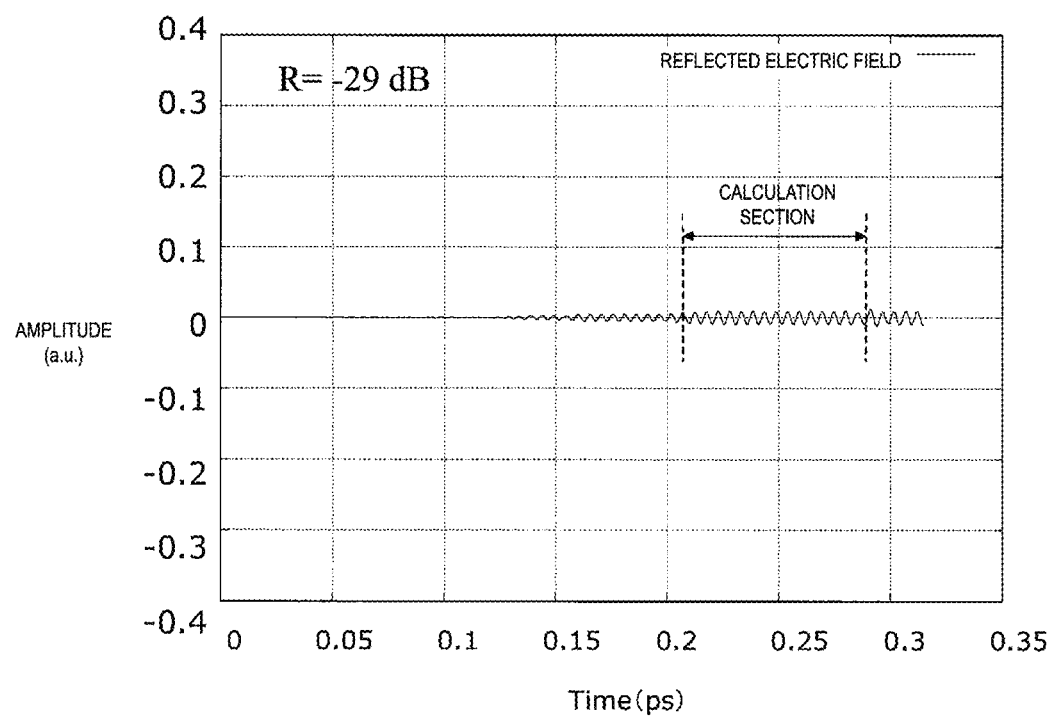
FIG. 20 is a graph showing a transient response of a reflected electric field at the first reference coordinates.

FIG. 20 illustrates a temporal change of a reflected electric field calculated by the reflectance calculation unit 42 based on the transient response of the electric field at the first reference coordinates p1. In FIG. 20, the horizontal axis represents time and the vertical axis represents amplitude. The reflectance R output by the reflectance calculation unit 42 after performing a Fourier transform on the reflected electric field in the calculation section indicated by the arrow in FIG. 20 is equal to −29 dB.

Figure 21:
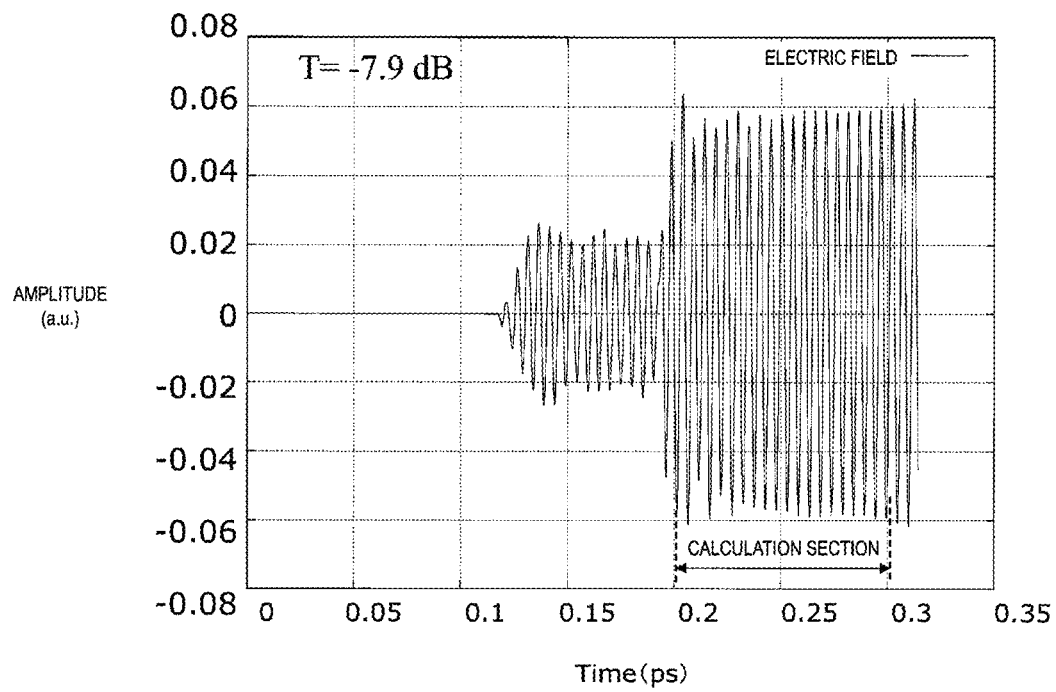
FIG. 21 is a graph showing a transient response of an electric field at second reference coordinates.

On the other hand, FIG. 21 illustrates a transient response of the electric field at the second reference coordinates p2 obtained by the second response calculation unit 33 from the distribution of the electric field of the optical connection structure 110b. In FIG. 21, the horizontal axis represents time and the vertical axis represents amplitude. The transmittance T output by the transmittance calculation unit 43 after performing a Fourier transform on the calculation section indicated by the arrow in FIG. 21 is equal to −7.9 dB.

Figure 22:
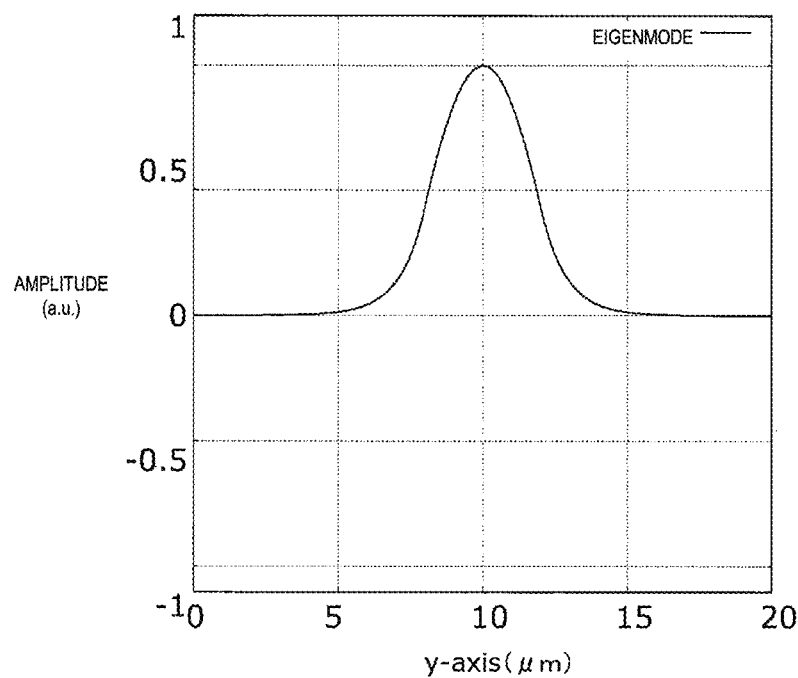
FIG. 22 is a graph showing an eigenmode of a second waveguide.
Figure 23:
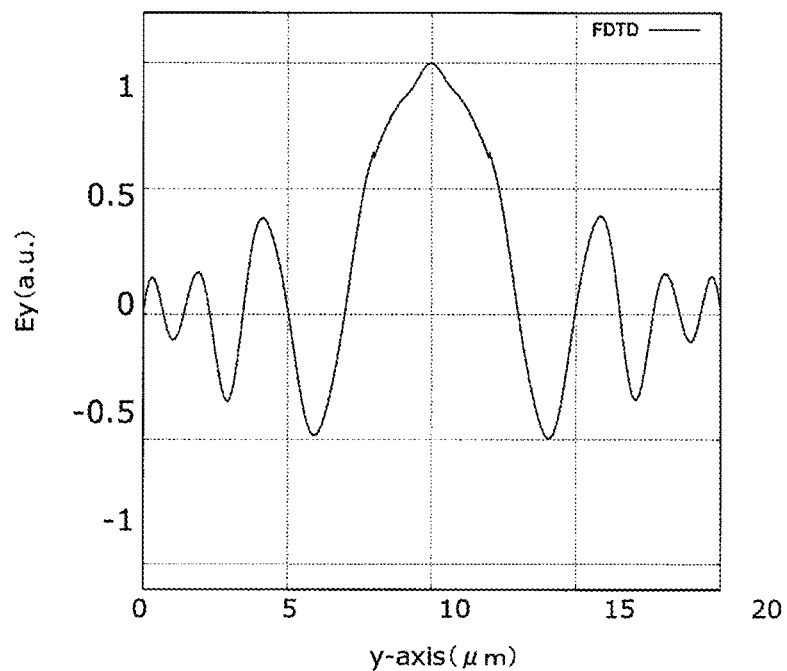
FIG. 23 is a graph showing a mode distribution of the second waveguide.

FIG. 22 illustrates an eigenmode (zeroth order) of the second waveguide 130 calculated by the eigenmode calculation unit 21. In addition, FIG. 23 illustrates the result of calculation of the mode distribution extraction unit 31 on the mode distribution at a reference plane a defined in a reference section I of the second waveguide 130 illustrated in FIG. 15. The mode distribution illustrated in FIG. 23 indicates a representative value of the mode distribution in the y axis direction.

Figure 24:
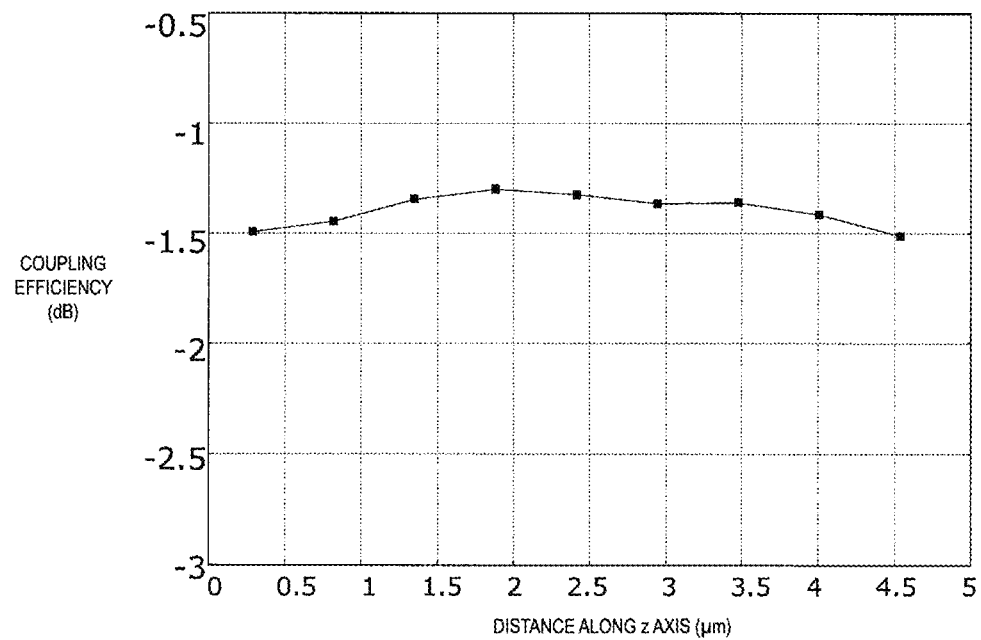
FIG. 24 is a graph for describing dependency of coupling efficiency of the second waveguide on the position of a reference plane.
Figure 25:
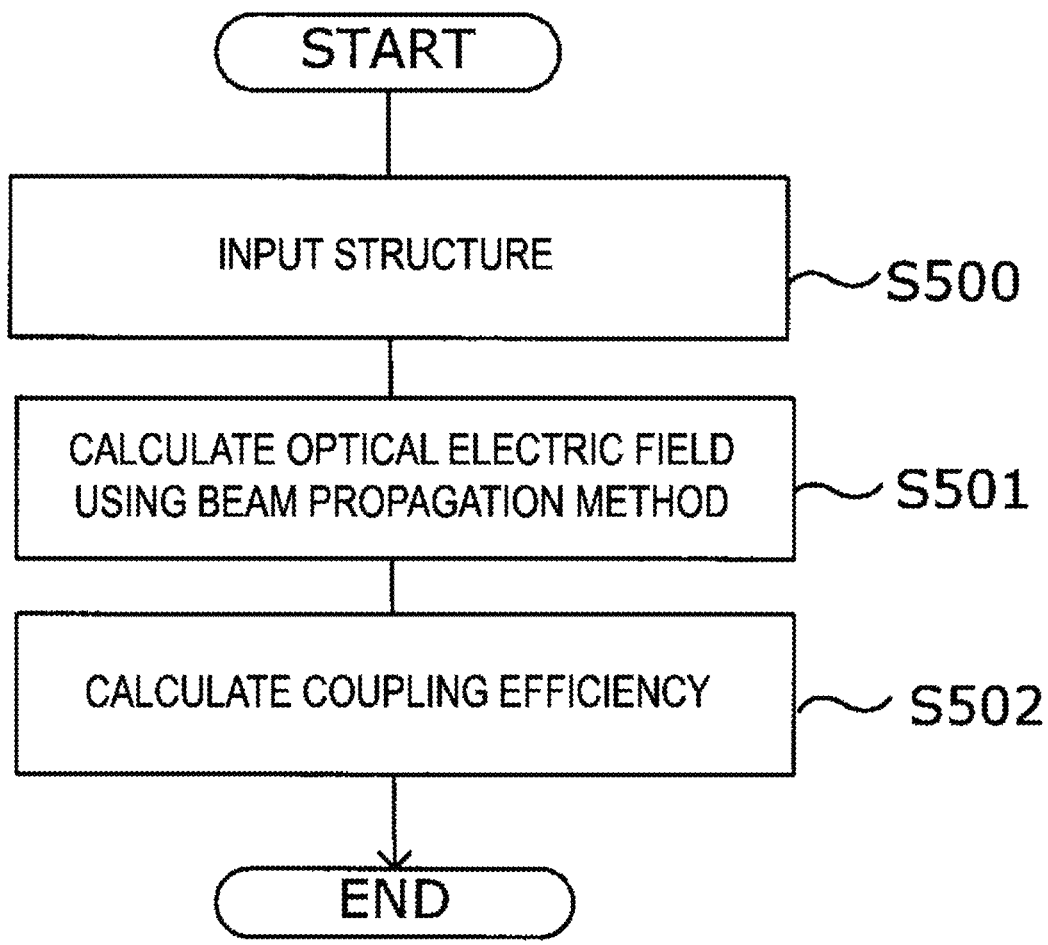
FIG. 25 is a flowchart for describing an optical connection structure analysis technique of the related art.

Furthermore, FIG. 24 illustrates the plotted result of the relationship between the coupling efficiency calculated by the coupling efficiency calculation unit 41 based on the mode distribution and a distance of the second waveguide 130 by changing the position of the reference plane a set in the second waveguide 130. The horizontal axis of FIG. 24 illustrates distance D from the right end of the reference section I along the z axis (FIG. 14). In addition, the vertical axis represents coupling efficiency [dB].

As described above, according to the analysis apparatus 1 according to the present embodiment, the waveguide mode of the waveguide in which zeroth or higher order eigenmodes are combined is calculated, and a distribution of the electromagnetic field of the optical connection structure is calculated in the FDTD method using the calculated waveguide mode as a light source, and thus, the optical connection structure can be analyzed even when many modes of the electromagnetic field are combined.

Although the embodiments of the analysis apparatus and the analysis method of the present invention have been described above, the present invention is not limited to the described embodiments, and various types of modification that can be conceived by a person skilled in the art can be made within the scope of the invention described in the aspects.

REFERENCE SIGNS LIST

1 Analysis apparatus
10 Setting unit
20 Solution unit
30 Data extraction unit
40 Characteristics analysis unit
50 Evaluation unit
11 First structure setting unit
12 Second structure setting unit
13 Third structure setting unit
21 Eigenmode calculation unit
22 Waveguide mode calculation unit
23 First distribution calculation unit
24 Second distribution calculation unit
31 Mode distribution extraction unit
32 First response calculation unit
33 Second response calculation unit
34 Third response calculation unit
41 Coupling efficiency calculation unit
42 Reflectance calculation unit
43 Transmittance calculation unit
110, 110a, 110b Optical connection structure
120 First waveguide
130 Second waveguide
140 Optical element
140b Adhesive layer
141b Lens
121,131 Core
122,132 Cladding
101 Bus
102 Processor
103 Main storage device
104 Communication interface
105 Auxiliary storage device
106 I/O device
107 Input device
108 Display device.

The invention claimed is:

1. An analysis apparatus for analyzing optical characteristics of a physical optical connection structure which has a distribution of an electromagnetic field in which many modes are combined, the analysis apparatus comprising:
  a setting device configured to set information on a structure of an optical connection structure based on a physical property value of the optical connection structure, wherein the optical connection structure includes a first waveguide, a second waveguide, and an optical element optically connecting the first waveguide and the second waveguide to each other;
  a solution device configured to solve a partial differential equation having, as an unknown, an electromagnetic field distributed in the optical connection structure based on the information on the structure of the optical connection structure to determine a distribution of the electromagnetic field, wherein the solution device comprises:
    a first distribution calculation device configured to calculate the distribution of the electromagnetic field in the optical connection structure; and
    a second distribution calculation device configured to calculate a distribution of a reference electric field indicating a distribution of an electromagnetic field of a region included in the first waveguide and the optical element when electromagnetic waves propagate from the first waveguide towards the second waveguide;
  a data extraction device configured to extract, from the distribution of the electromagnetic field determined by the solution device, a mode distribution in a plane at a predetermined position of the optical connection structure and a time response of an electromagnetic field at a predetermined position of the optical connection structure, wherein the data extraction device comprises:
  a first response calculation device configured to obtain a temporal change of an electric field at first reference coordinate set at a position intersecting an optical axis of the optical element by the distribution of the electromagnetic field calculated by the first distribution calculation device;
  a second response calculation device configured to obtain a temporal change of an electric field at second reference coordinate set at a position intersecting the optical axis of the second waveguide by the distribution of the electromagnetic field calculated by the first distribution calculation device; and
  a third response calculation device configured to obtain a temporal change of the reference electric field at the first reference coordinate set from the distribution of the reference electric field calculated by the second distribution calculation device;
a characteristics analysis device configured to analyze optical characteristics of the optical connection structure based on the mode distribution and the time response of the electromagnetic field extracted by the data extraction device; and
an evaluation device configured to determine whether to modify the physical property value of the optical connection structure based on the optical characteristics output by the characteristic analysis device.

2. The analysis apparatus according to claim 1, wherein: the solution device includes:
  a waveguide mode calculation device configured to calculate a waveguide mode indicating an electromagnetic field in which zeroth or higher order eigenmodes are combined when reflection does not occur on an end surface of the first waveguide facing the optical element, wherein the first distribution calculation device is configured to calculate the distribution of the electromagnetic field based on the waveguide mode.

3. The analysis apparatus according to claim 2, wherein: the solution device includes an eigenmode calculation device configured to calculate an eigenmode of the second waveguide;
the data extraction device includes a mode distribution extraction device configured to extract a mode distribution within a cross section intersecting an optical axis of the second waveguide; and
the characteristics analysis device includes a coupling efficiency calculation device configured to calculate a coupling efficiency of the eigenmode and the mode distribution based on the eigenmode calculated by the eigenmode calculation device and the mode distribution extracted by the mode distribution extraction device.

4. The analysis apparatus according to claim 1, wherein the characteristics analysis device includes a reflectance calculation device configured to calculate a reflectance at the first reference coordinate set based on the temporal change of the electric field at the first reference coordinate set obtained by the first response calculation device and the temporal change of the reference electric field obtained by the third response calculation device.

5. The analysis apparatus according to claim 1, wherein the characteristics analysis device includes a transmittance calculation device configured to calculate a transmittance at the second reference coordinate set based on the temporal change of the electric field at the second reference coordinate set obtained by the second response calculation device and the temporal change of the reference electric field obtained by the third response calculation device.

6. The analysis apparatus according to claim 1, further comprising:
  an evaluation device configured to evaluate the structure of the optical connection structure set by the setting device based on preset optical characteristics from optical characteristics of the optical connection structure analyzed by the characteristics analysis device.

7. An analysis method for analyzing optical characteristics of a physical optical connection structure which has a distribution of an electromagnetic field in which many modes are combined, the method comprising:
  setting information on a structure of an optical connection structure based on a physical property value of the optical connection structure, wherein the optical connection structure comprises includes a first waveguide, a second waveguide, and an optical element optically connecting the first waveguide and the second waveguide to each other;
  solving a partial differential equation having, as an unknown, an electromagnetic field distributed in the optical connection structure based on the information on the structure of the optical connection structure to determine a distribution of the electromagnetic field;
  calculating a distribution of a reference electric field indicating a distribution of an electromagnetic field of a region included in the first waveguide and the optical element when electromagnetic waves propagate from the first waveguide toward the second waveguide;
  obtaining, from the distribution of the electromagnetic field, a mode distribution in a plane at a predetermined position of the optical connection structure and a time response of an electromagnetic field at a predetermined position of the optical connection structure, wherein obtaining the mode distribution and the time response of the electromagnetic field comprises:
    obtaining a temporal change of an electric field at first reference coordinate set at a position intersecting an optical axis of the optical element by the distribution of the electromagnetic field of the region included in the optical connection structure;
    obtaining a temporal change of an electric field at second reference coordinate set at a position intersecting the optical axis of the second waveguide by the distribution of the electromagnetic field of the region included in the optical connection structure, and
    obtaining a temporal change of the reference electric field at the first reference coordinate set from the distribution of the reference electric field;
  analyzing optical characteristics of the optical connection structure based on the mode distribution and the time response of the electromagnetic field; and
  determining whether to modify the physical property value of the optical connection structure based on the optical characteristics.

8. The method according to claim 7, wherein solving the partial differential equation to determine the distribution of the electromagnetic field further comprises:
  calculating a waveguide mode indicating an electromagnetic field in which zeroth or higher order eigenmodes are combined when reflection does not occur on an end surface of the first waveguide facing the optical element, wherein calculating the distribution of the electromagnetic field comprises calculating the distribution of the electromagnetic field based on the waveguide mode.

\* \* \* \* \*